US006786856B2

(12) United States Patent
Kato et al.

(10) Patent No.: US 6,786,856 B2
(45) Date of Patent: Sep. 7, 2004

(54) CAM-TYPE AUTOMATIC TOOL-EXCHANGING APPARATUS HAVING SHUTTER DRIVING MECHANISM

(75) Inventors: Heizaburo Kato, Shizuoka (JP); Hideaki Hattori, Gifu (JP); Kiyoshi Nishida, Gifu (JP); Kazuya Horibe, Gifu (JP); Satoshi Okada, Aichi (JP)

(73) Assignees: Sankyo Manufacturing Co., Ltd., Tokyo (JP); Yamazaki Mazak Corporation, Aichi (JP)

( * ) Notice: Subject to any disclaimer, the term of this patent is extended or adjusted under 35 U.S.C. 154(b) by 0 days.

(21) Appl. No.: 10/241,099

(22) Filed: Sep. 11, 2002

(65) Prior Publication Data

US 2003/0050159 A1 Mar. 13, 2003

(30) Foreign Application Priority Data

Sep. 11, 2001 (JP) .................................... 2001-275275
Sep. 9, 2002 (JP) .................................... 2002-262998

(51) Int. Cl.[7] .......................... B23Q 3/157; B23Q 11/08
(52) U.S. Cl. ............................................. 483/3; 483/39
(58) Field of Search ........................... 483/3, 39, 40, 483/60, 58, 64

(56) References Cited

U.S. PATENT DOCUMENTS 5,649,887 A * 7/1997 Taki et al. ..................... 483/3
5,704,884 A   1/1998 Uemura et al.
6,077,206 A * 6/2000 Azema ........................... 483/3
6,090,025 A * 7/2000 Matsuoka et al. .............. 483/2

FOREIGN PATENT DOCUMENTS

| JP | 60-31545 | | 3/1985 |
| JP | 64-1830 | | 1/1989 |
| JP | 7-60596 A | * | 3/1995 |

* cited by examiner

Primary Examiner—William Briggs
Assistant Examiner—Erica E Cadugan
(74) Attorney, Agent, or Firm—Harness, Dickey & Pierce, PLC

(57) ABSTRACT

A cam-type automatic tool-exchanging apparatus comprises: a housing; an input rotary shaft within the housing; a rotational-motion converting cam within the housing and rotationally driven by the input rotary shaft and outputting a rotational motion; a lifting/lowering-motion producing cam provided the housing and rotationally driven by the input rotary shaft and outputting a lifting/lowering motion; a tool-exchanging arm provided outside the housing and driven by the rotational motion and the lifting/lowering motion outputted for performing a tool-exchanging operation; a shutter provided outside the housing and to be opened/closed in accordance with the tool-exchanging operation; an opening/closing-motion producing cam within the housing and rotationally driven by the input rotary shaft and outputting a shutter-opening/closing pivotal motion for opening/closing the shutter; and a shutter-driving rotary shaft within the housing and outputting the shutter-opening/closing pivotal motion of the opening/closing-motion producing cam from inside of the housing to the outside.

8 Claims, 39 Drawing Sheets

FIG. 9A
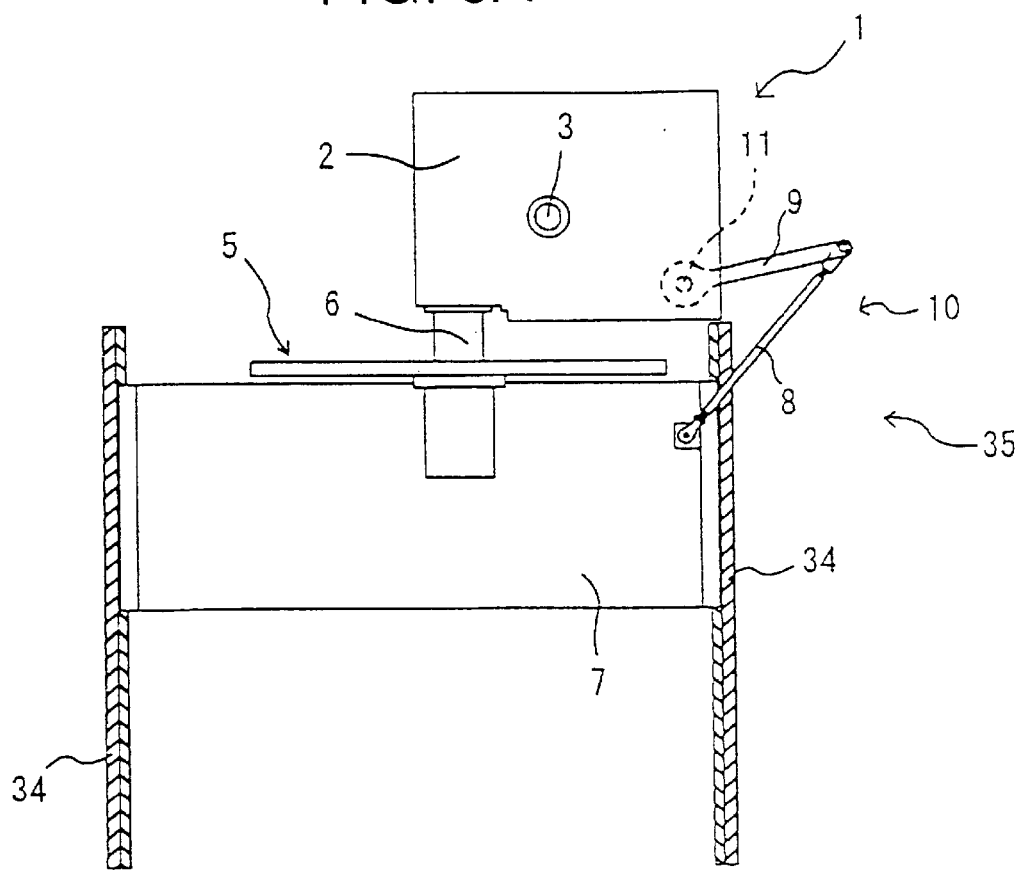
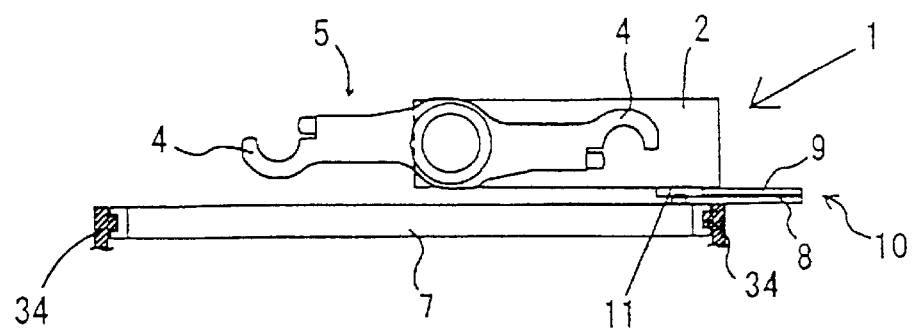
FIG. 9B

FIG. 12A
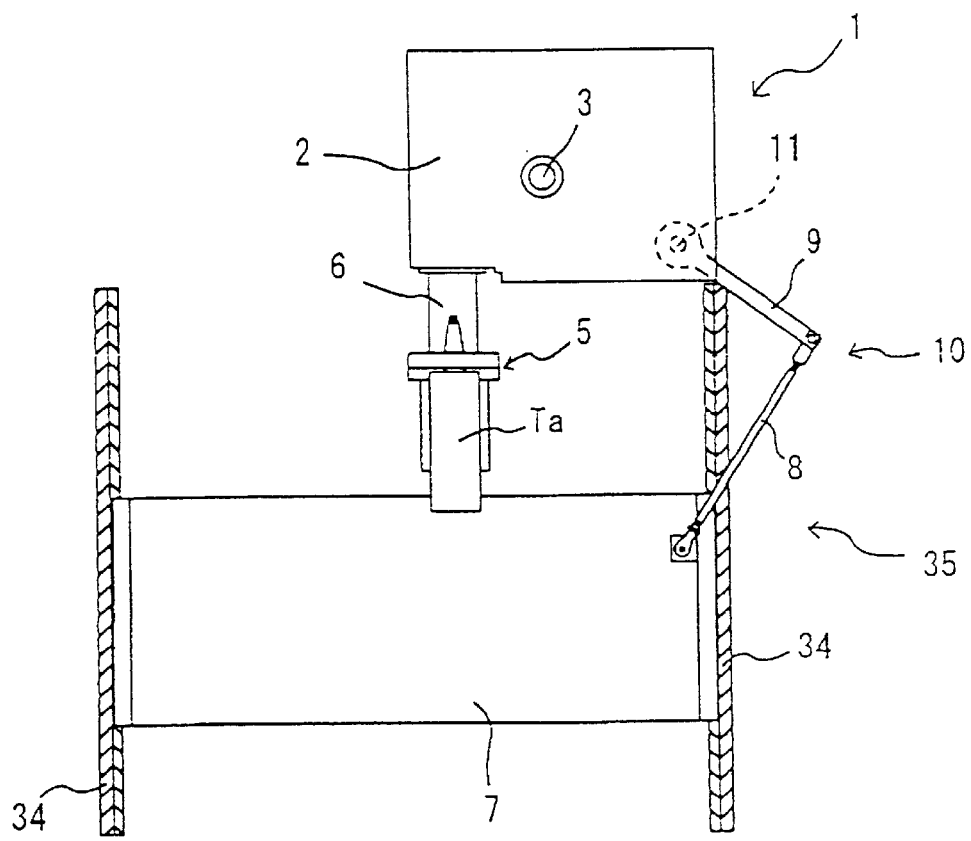
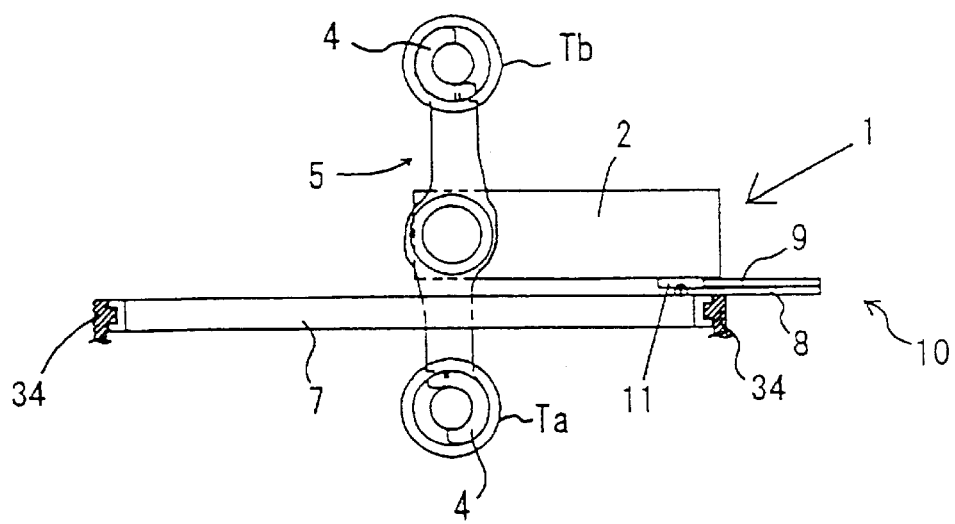
FIG. 12B

FIG. 13A
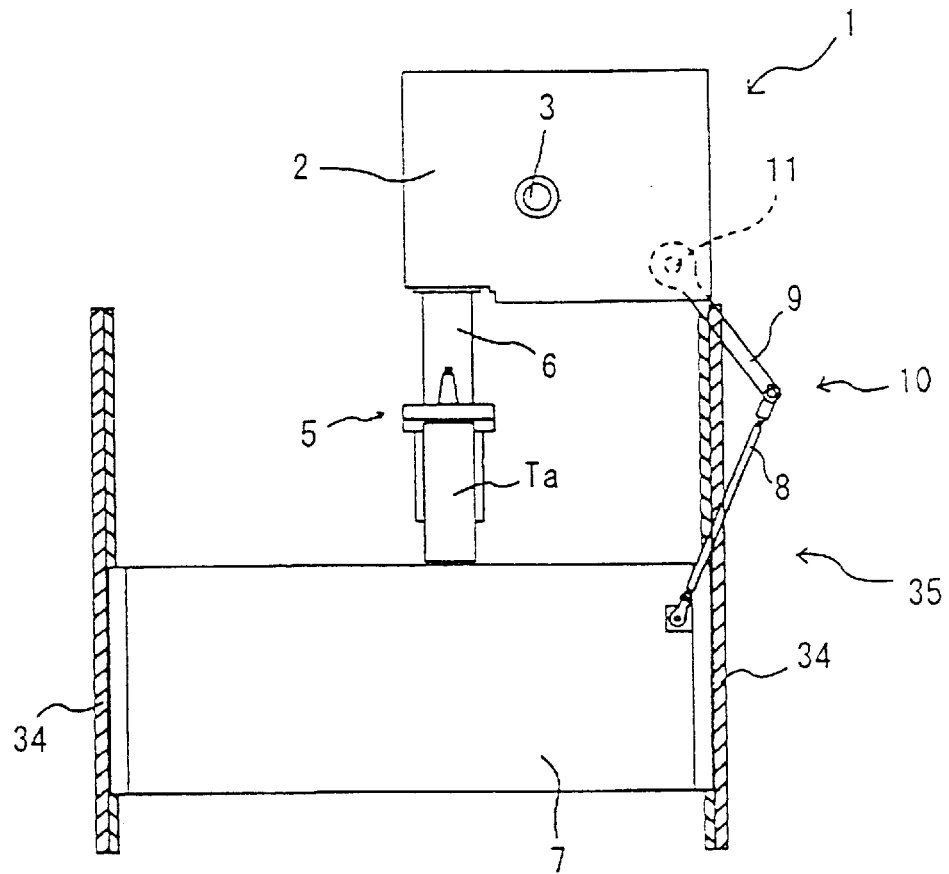
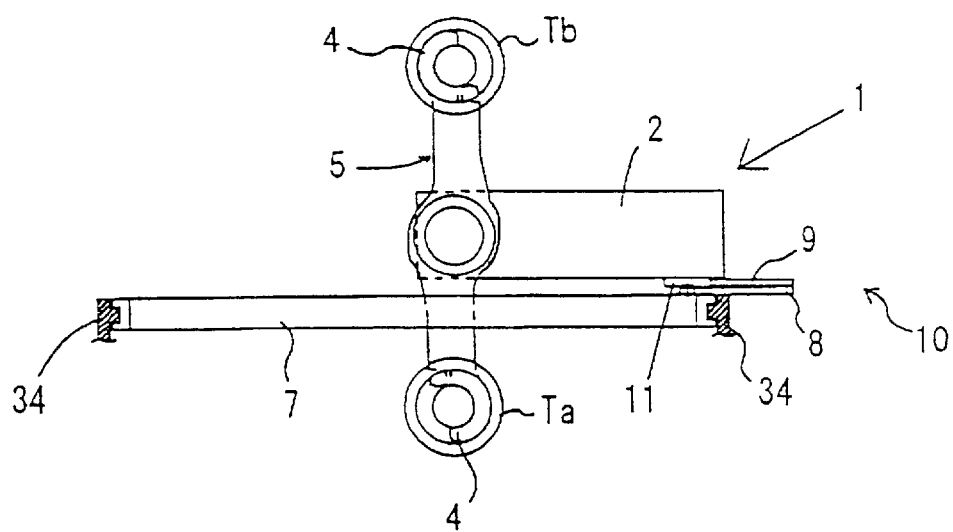
FIG. 13B

FIG. 15A
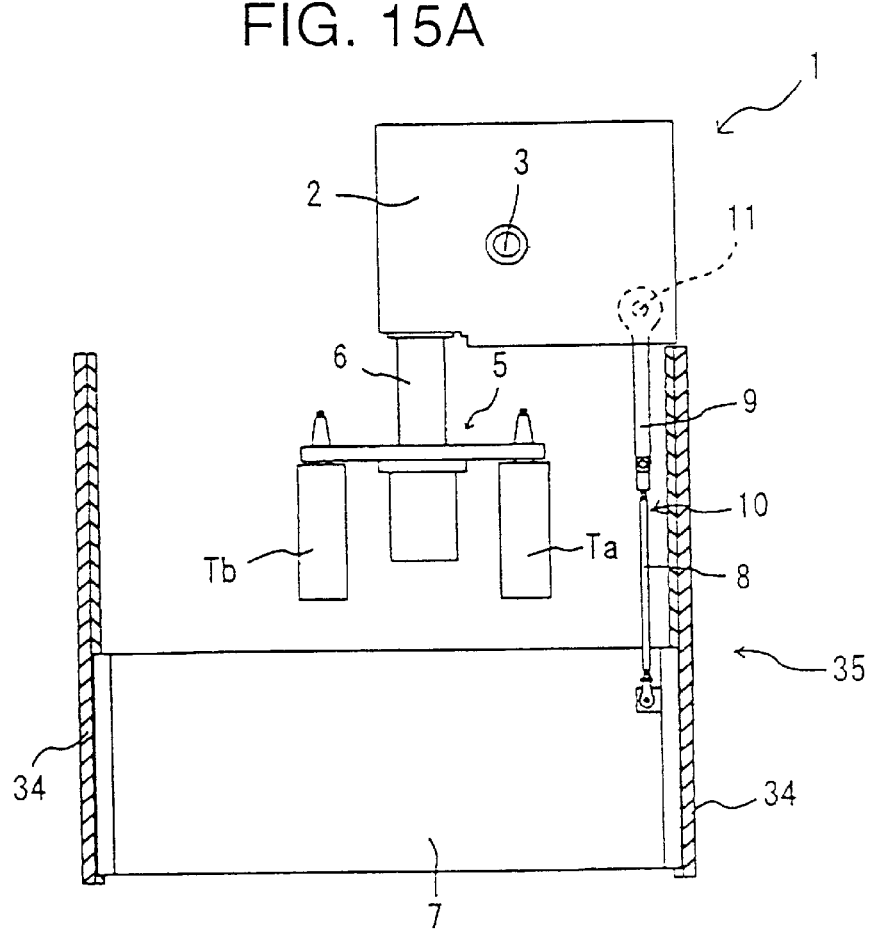
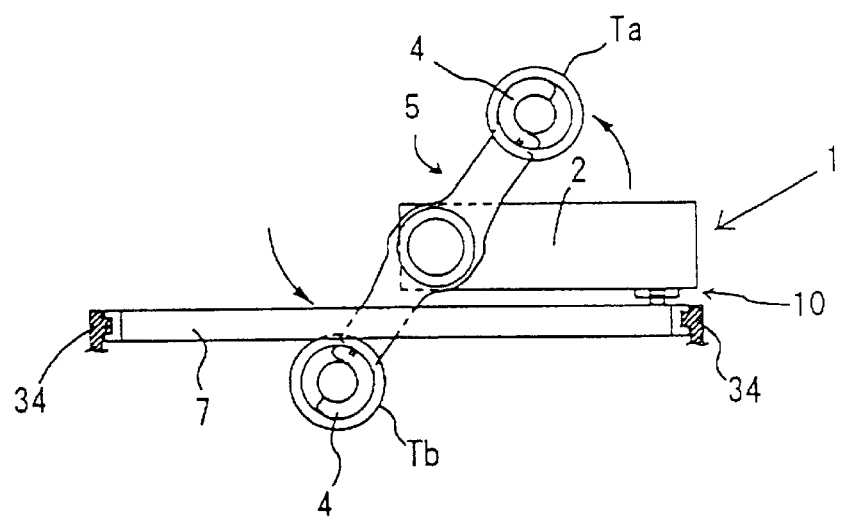
FIG. 15B

FIG. 16A
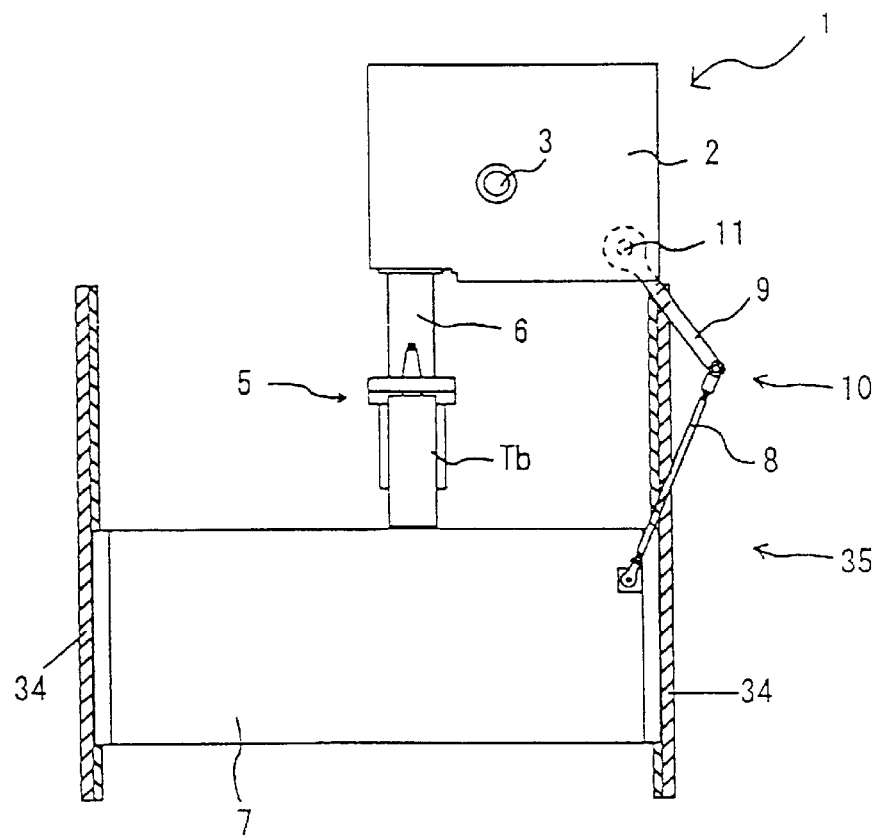
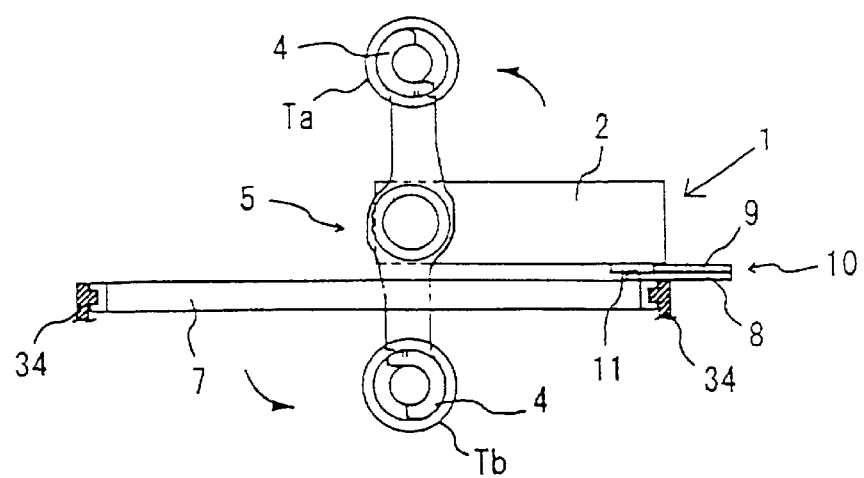
FIG. 16B

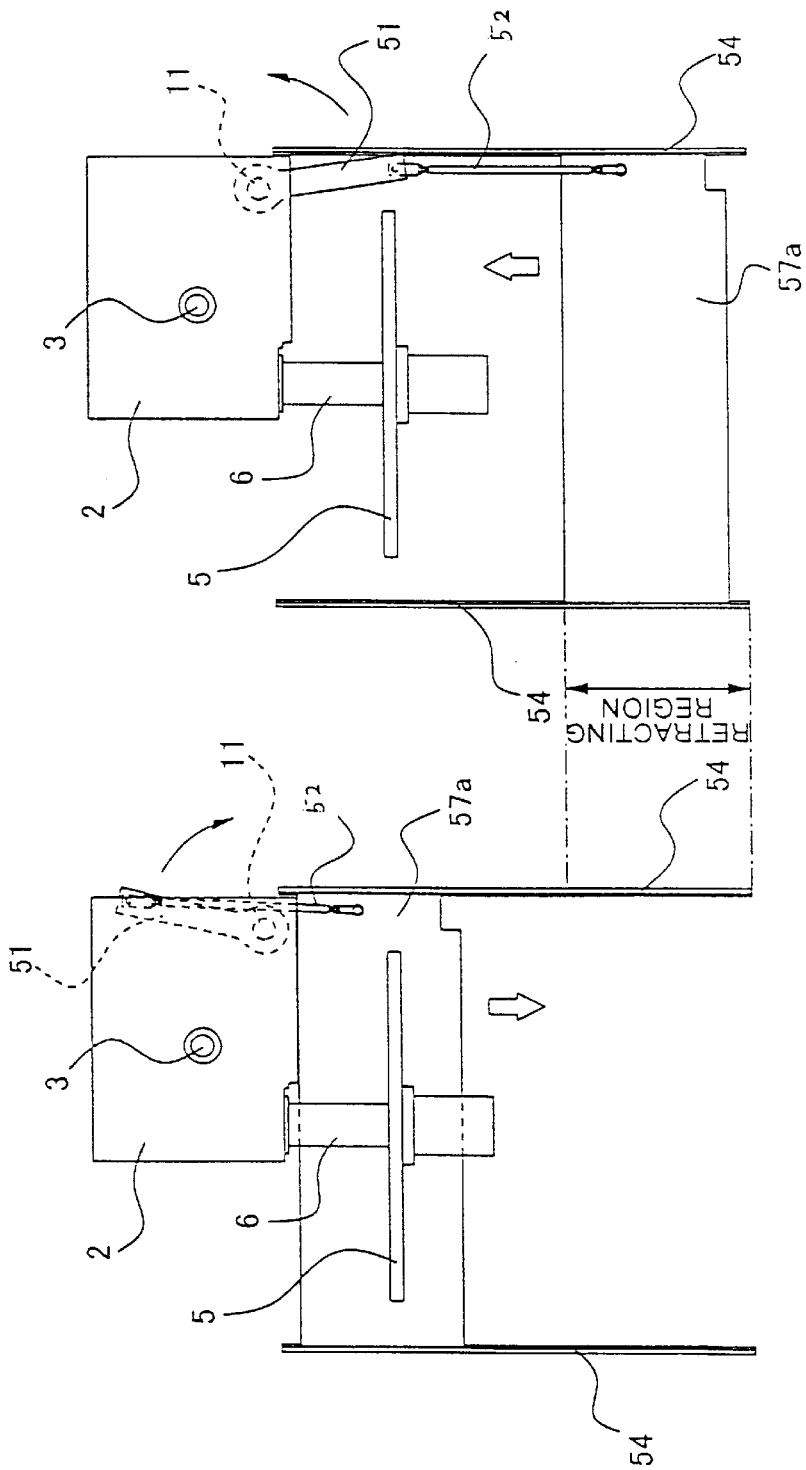

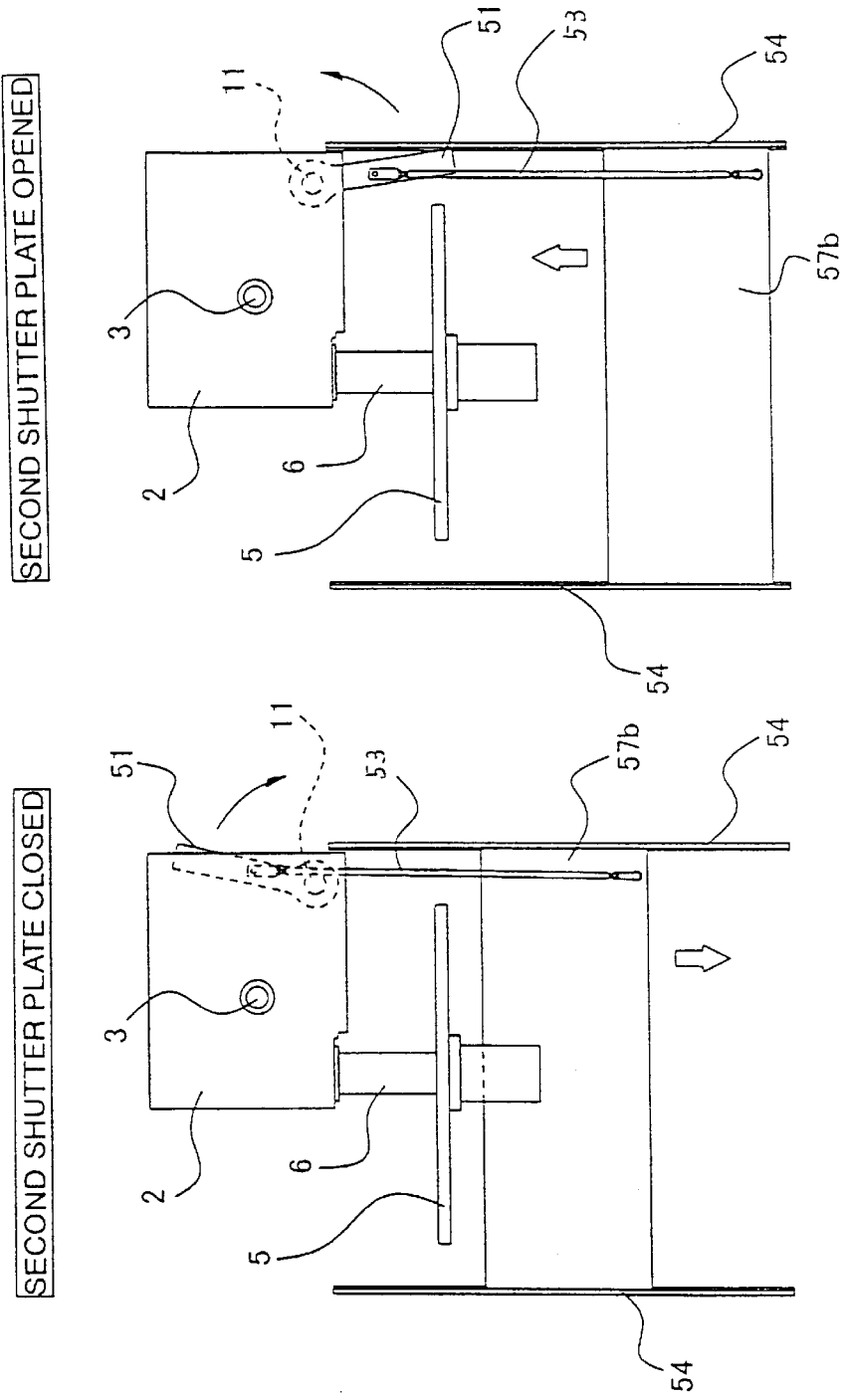

FIG. 28A
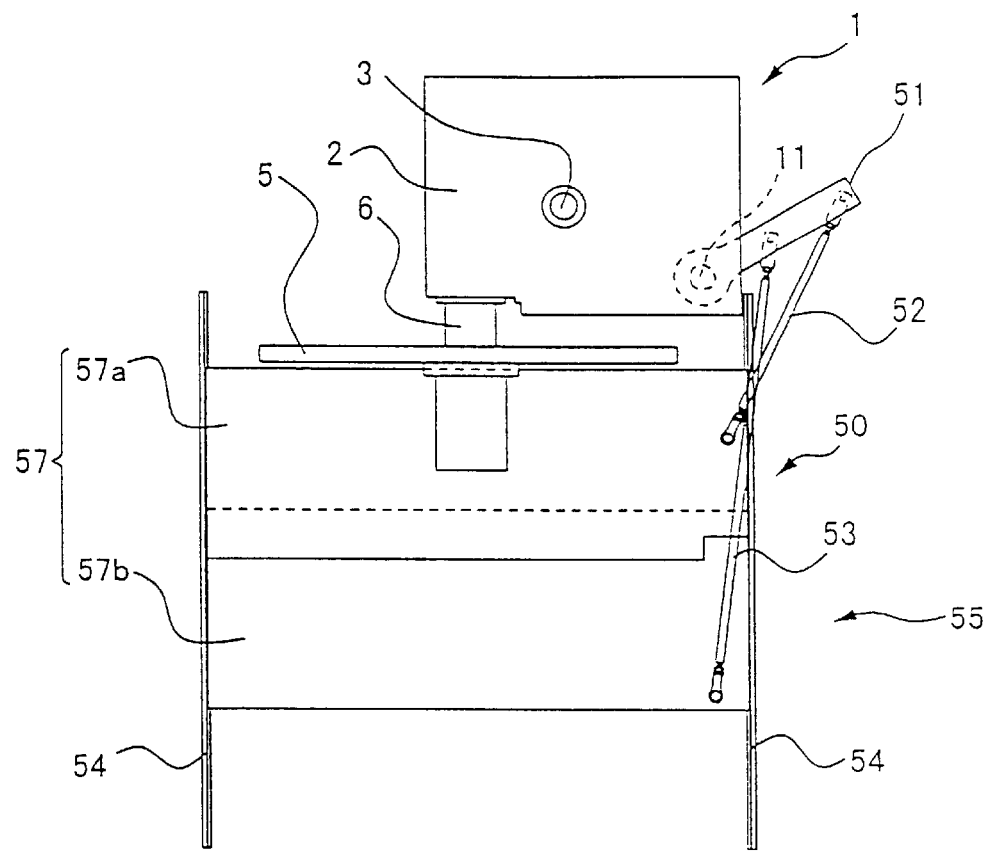
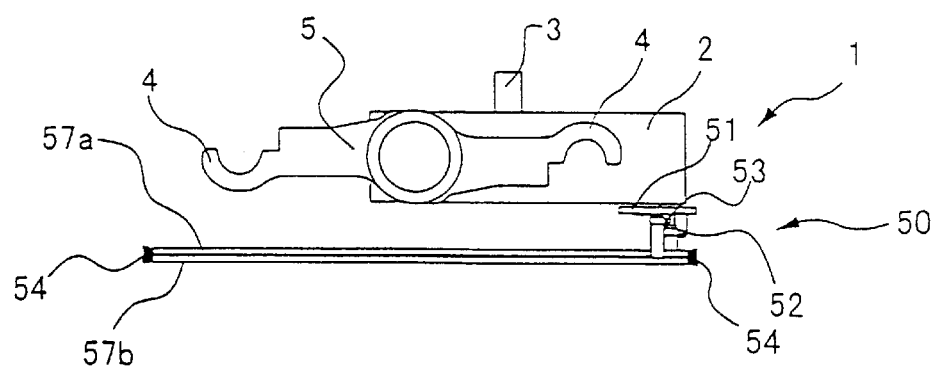
FIG. 28B

FIG. 29A
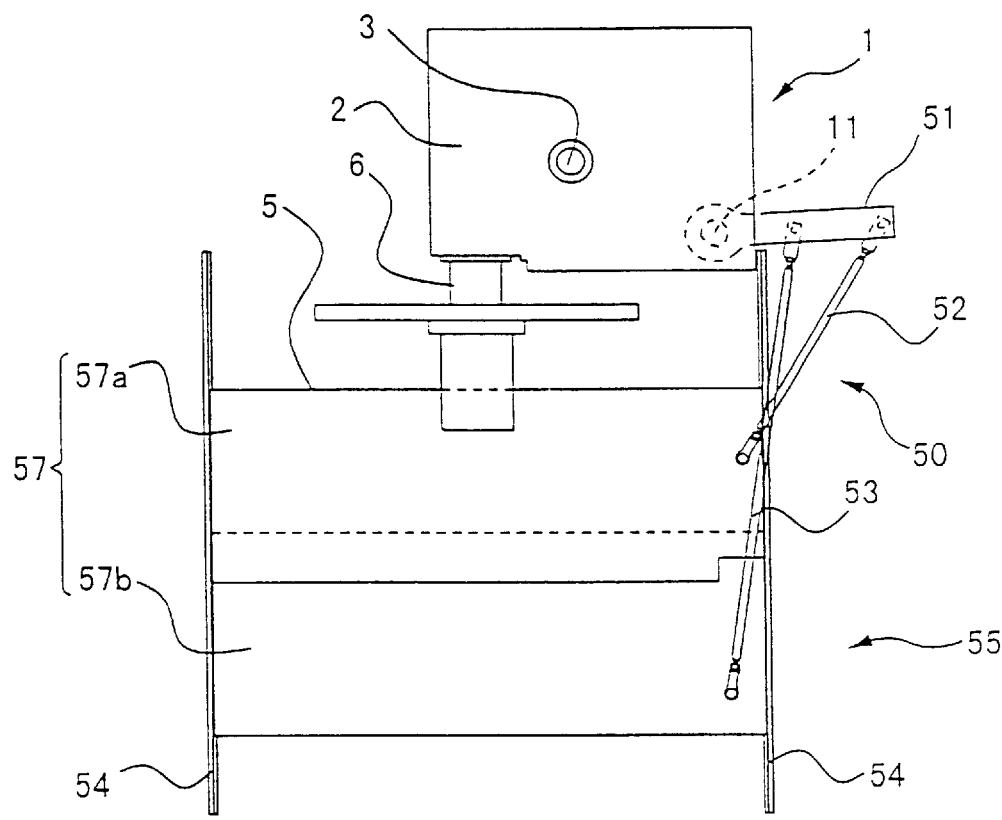
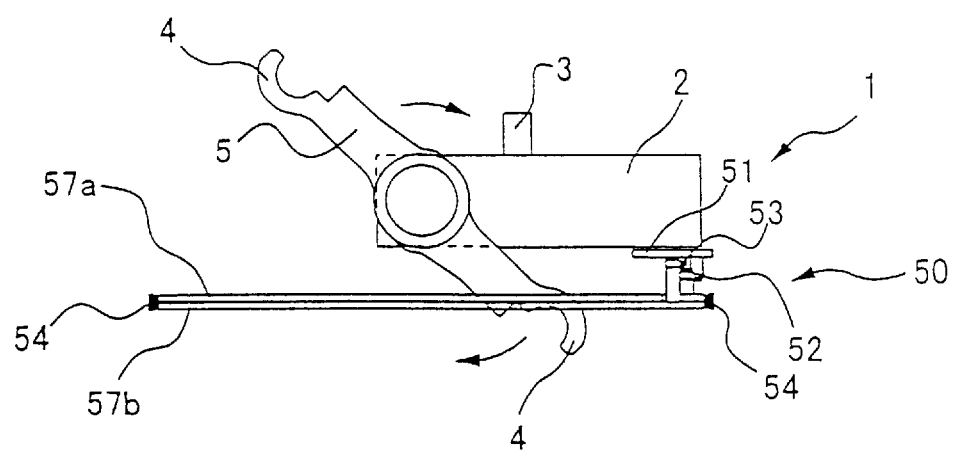
FIG. 29B

FIG. 33A
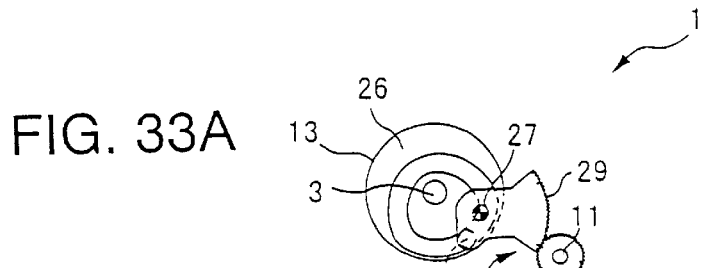
FIG. 33B
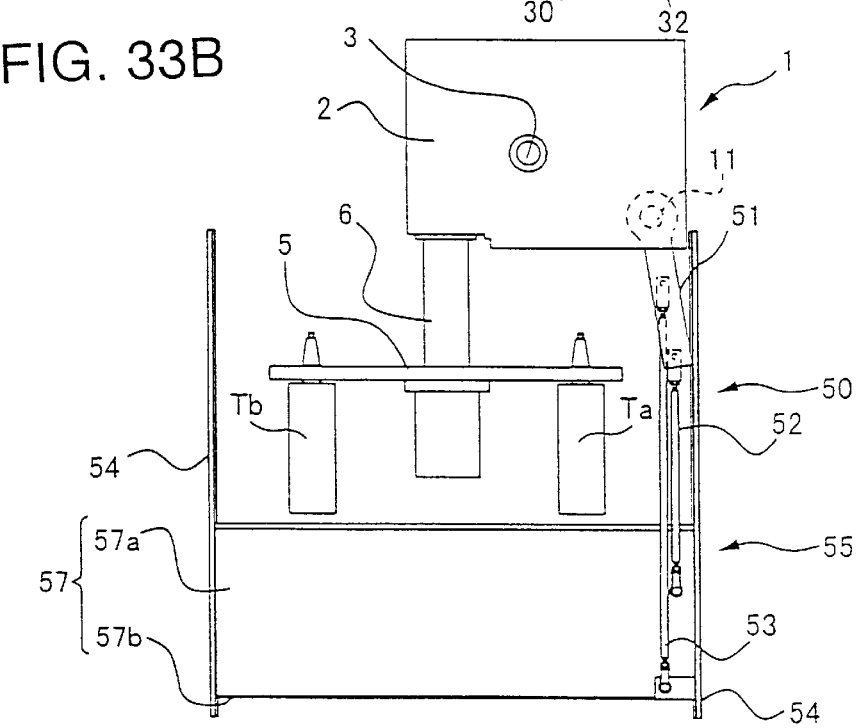
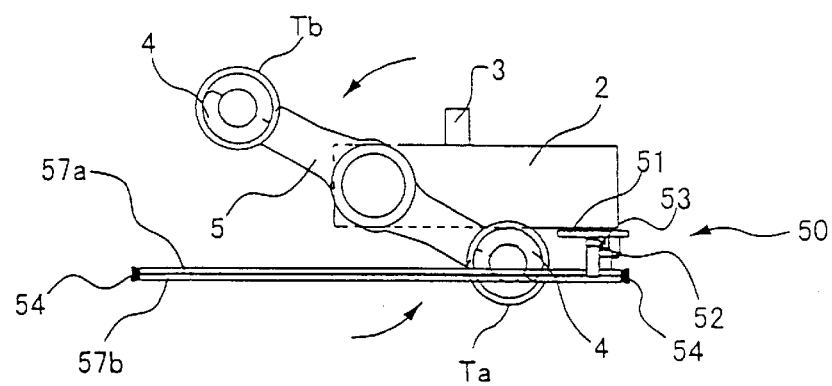
FIG. 33C

FIG. 37A
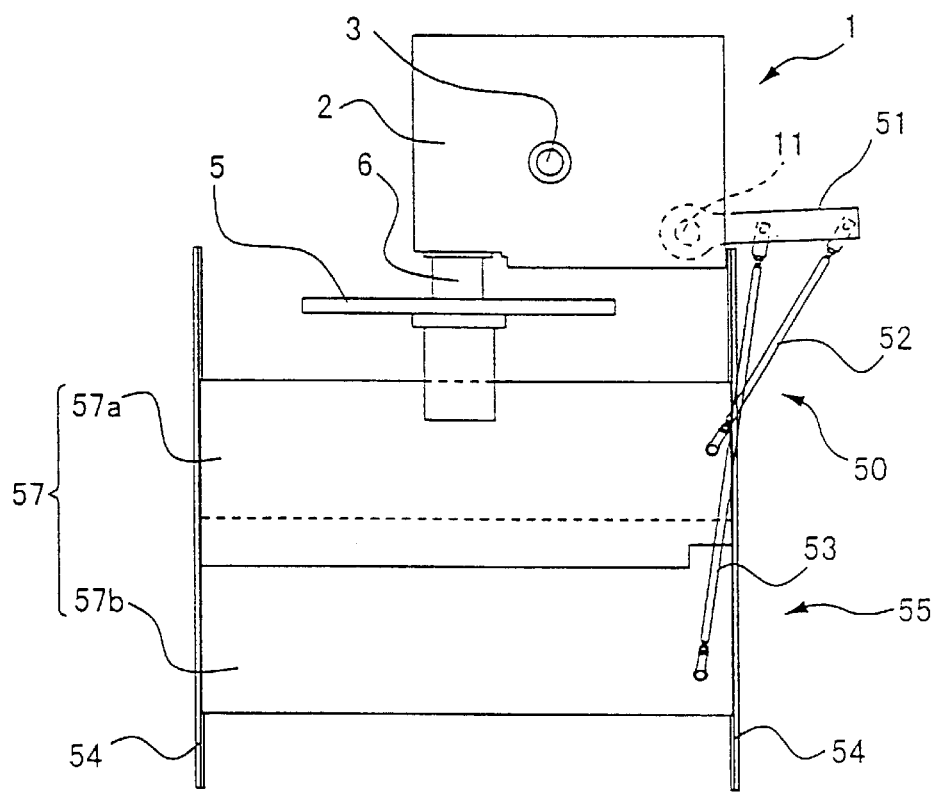
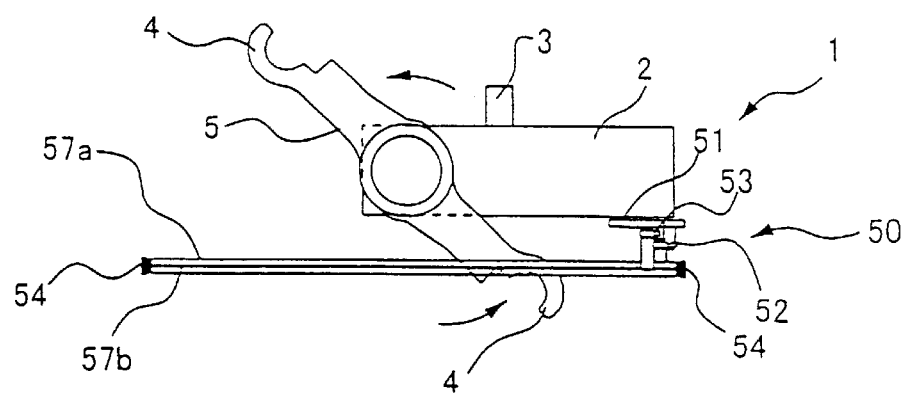
FIG. 37B

FIG. 38A
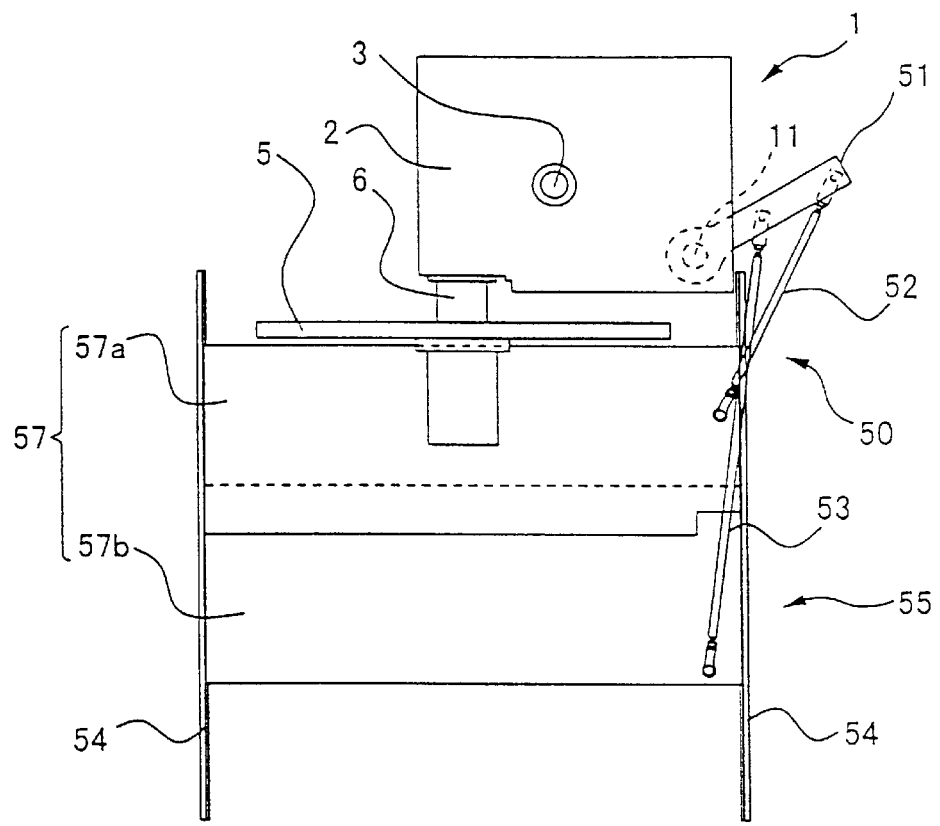
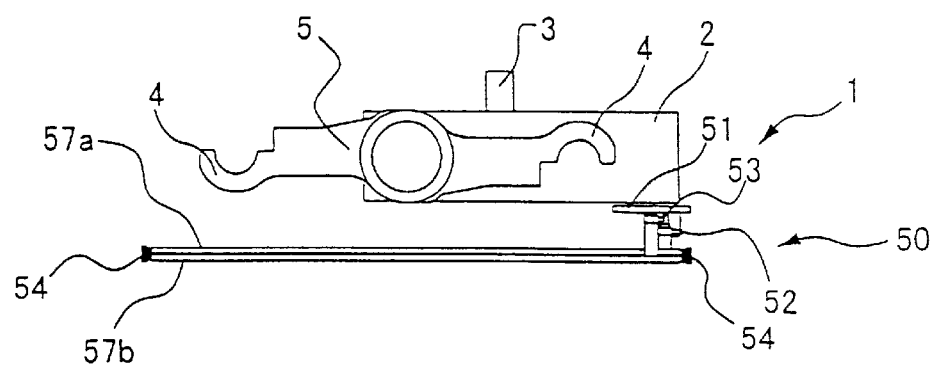
FIG. 38B

FIG. 39A
SHUTTER OPENED
TWO-PIECE SHUTTER 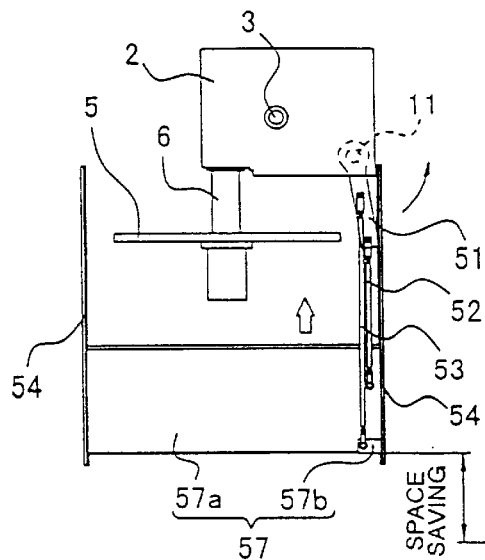 ONE-PIECE SHUTTER 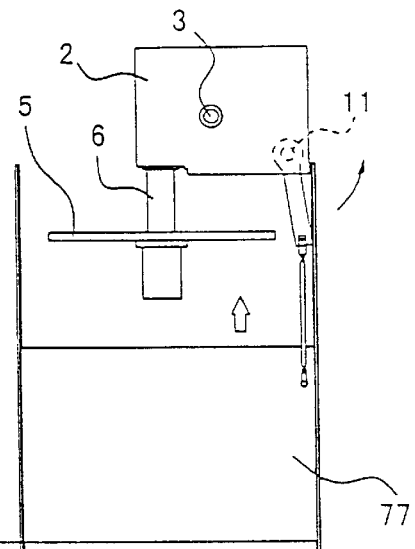
SHUTTER CLOSED 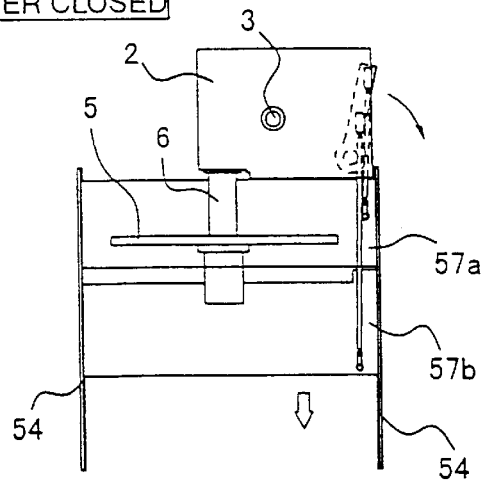 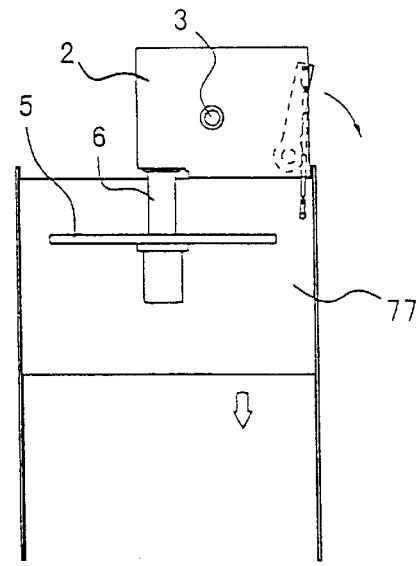
FIG. 39B

CAM-TYPE AUTOMATIC TOOL-EXCHANGING APPARATUS HAVING SHUTTER DRIVING MECHANISM

CROSS-REFERENCE TO RELATED APPLICATIONS

The present application claims priority upon Japanese Patent Application No. 2001-275275 filed on Sep. 11, 2001 and Japanese Patent Application No. 2002-262998 filed on Sep. 9, 2002, which are herein incorporated by reference.

BACKGROUND OF THE INVENTION

1. Field of the Invention

The present invention relates to a cam-type automatic tool-exchanging apparatus of a simple structure having a shutter-driving mechanism which can certainly synchronize a tool-exchanging operation and a shutter-opening/closing operation in a short cycle time, and can ensure high-speed operation of the overall tool-exchanging operation including the opening/closing operation of the shutter.

2. Description of the Related Art

Conventionally, as an automatic tool-exchanging apparatus, often employed is a cam-type automatic tool-exchanging apparatus which can perform tool exchanging within a quite short cycle time as short as 0.5 to 1 second, and has stability and quite a high accuracy in movement in exchanging operation. Between the automatic tool-exchanging apparatus and a machining space of a machine tool that actually performs machining, at least one shutter is provided in order to prevent cutting chip, oil and so forth generated in the machining space from scattering towards the automatic tool-exchanging apparatus.

The shutter is closed for separating between the machining space and the automatic tool-exchanging apparatus during machining operation in the machining space, and is opened upon exchanging of the tool so that the tool-exchanging arm of the automatic tool-exchanging apparatus can be inserted within the machining space. For opening/closing the shutter, it becomes necessary to move the shutter for a substantial stroke. Conventionally, for driving the shutter, a cylinder-type driving device which can obtain a large stroke has been employed. Particularly, an air cylinder using air which will not contaminate the circumference is employed as a driving source. In this kind of cylinder-type shutter driving device, the starting point and the end point of the opening/closing stroke are detected by a sensor, such as a limit switch.

In this case, while the cam-type automatic tool-exchanging apparatus is driven by a motor, the shutter is driven by the air cylinder set forth above. Since the cam-type automatic tool-exchanging apparatus and the shutter are driven using different kinds of driving source, it has been quite difficult to establish synchronization between opening/closing operation of the shutter and the tool-exchanging operation of the tool-exchanging arm in a quite short cycle time. Furthermore, while the automatic tool-exchanging apparatus can perform high-speed operation, the shutter driven by the air cylinder is required checking of the opening/closing stroke with the sensor. Particularly, it is required to wait for checking the "opening" before initiating the tool-exchanging operation with the tool-exchanging arm. This would cause difficulty in achieving high-speed operation regarding the entire tool-exchanging operation. Furthermore, the shutter which is opened to provide enough space for permitting exchanging of the tool is required to have a size to cover the space opened, and thus, the shutter will be quite large in size. Therefore, a large receptacle space will be necessary upon opening the shutter. Also, it becomes difficult to move the shutter at high speed.

On the other hand, in order to simply the synchronization of the opening/closing operation of the shutter and the tool-exchanging operation, it may be considered to drive the shutter with a rotary drive shaft driving a cam of the automatic tool-exchanging apparatus. However, different from a cylinder performing a stroke operation, in order to create a stroke necessary for opening/closing of the shutter from a rotary motion of the rotary drive shaft, a complicate mechanism has to be installed. For example, it may be considered to insert a mechanism, such as rack and pinion type mechanism, between the rotary drive shaft and the shutter. However, even with such construction, it is required to interpose a reversible speed reducer having a substantially large gear ratio it in order to obtain the necessary stroke for opening/closing the shutter.

In all cases, the mechanism for opening/closing the shutter sharing the rotary drive shaft for driving the cam of the automatic tool-exchanging apparatus becomes quite complicate in comparison with the air cylinder system.

The present invention has been contrived in view of the above and other problems. It is an object of the present invention to provide a cam-type automatic tool-exchanging apparatus of a simple structure having a shutter-driving mechanism which can certainly establish synchronization between a tool-exchanging operation and opening/closing operation of a shutter in a short cycle time, and which can ensure high-speed operation of the overall tool-exchanging operation including the opening/closing operation of the shutter.

SUMMARY OF THE INVENTION

In order to accomplish the above and other objects, a cam-type automatic tool-exchanging apparatus according to one aspect of the present invention comprises: a housing; an input rotary shaft provided within the housing; a rotational-motion converting cam provided within the housing, the rotational-motion converting cam being rotationally driven by the input rotary shaft and outputting a rotational motion; a lifting/lowering-motion producing cam provided within the housing, the lifting/lowering-motion producing cam being rotationally driven by the input rotary shaft and outputting a lifting/lowering motion; a tool-exchanging arm provided outside of the housing and driven by the rotational motion and the lifting/lowering motion outputted from the cams for performing a tool-exchanging operation; a shutter provided outside of the housing, the shutter to be opened/closed in accordance with the tool-exchanging operation of the tool-exchanging arm; an opening/closing-motion producing cam provided within the housing, the opening/closing-motion producing cam being rotationally driven by the input rotary shaft and outputting a shutter-opening/closing pivotal motion for opening/closing the shutter; and a shutter-driving rotary shaft provided within the housing, the shutter-driving rotary shaft outputting the shutter-opening/closing pivotal motion of the opening/closing-motion producing cam from inside of the housing to the outside.

According to another aspect of the present invention, the shutter comprises a plurality of plate members; and the plurality of plate members are made to overlap each other and the shutter is made to open according to the rotational motion of the input rotary shaft.

The cam-type automatic tool-exchanging apparatus may further comprise: a pivotal arm, the pivotal arm being pivotally supported on the housing, having on one end a cam follower engaging with the opening/closing-motion producing cam, and having on the other end a sector gear; and a driven gear provided on the shutter-driving rotary shaft and meshing with the sector gear, wherein the shutter-opening/closing pivotal motion of the opening/closing-motion producing cam is transmitted to the shutter-driving rotary shaft.

A turning radius of the sector gear can be made to be greater than a turning radius of the driven gear so that a range of rotation angle of the shutter-driving rotary shaft is set to be greater than a range of pivoting angle of the pivotal arm.

The shutter may structure a slider crank mechanism by being provided slidably on at least one slide guide for guiding sliding of the shutter, and connected to the shutter-driving rotary shaft via a crank mechanism.

The crank mechanism may comprise a rotating arm provided on the shutter-driving rotary shaft, and a plurality of stroke rods having different lengths and respectively connecting the rotating arm and the plurality of plate members, the respective stroke rods being sequentially arranged on the rotating arm in order of increasing length from a tip end side of the rotating arm toward the shutter-driving rotary shaft.

The rotational-motion converting cam, the lifting/lowering-motion producing cam, and the opening/closing motion producing cam may be formed to have cam profiles for overlapping a timing of the tool-exchanging operation and a timing of the opening/closing operation, so as to make the tool-exchanging operation of the tool-exchanging arm be performed during a period of the opening/closing operation of the shutter in parallel.

The rotational-motion converting cam, the lifting/lowering-motion producing cam, and the opening/closing motion producing cam may be provided on a single cam body, the cam body being provided on the input rotary shaft.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 9 is an explanatory illustration for explaining a second stage of operation of the cam-type automatic tool-exchanging apparatus shown in FIG. 1;

FIG. 12 is an explanatory illustration for explaining a fifth stage of operation of the cam-type automatic tool-exchanging apparatus shown in FIG. 1;

FIG. 13 is an explanatory illustration for explaining a sixth stage of operation of the cam-type automatic tool-exchanging apparatus shown in FIG. 1;

FIG. 15 is an explanatory illustration for explaining an eighth stage of operation of the cam-type automatic tool-exchanging apparatus shown in FIG. 1;

FIG. 16 is an explanatory illustration for explaining a ninth stage of operation of the cam-type automatic tool-exchanging apparatus shown in FIG. 1;

FIGS. 25A and 25B are explanatory illustrations for explaining the operation of a first shutter plate by a crank mechanism;

FIGS. 26A and 26B are explanatory illustrations for explaining the operation of a second shutter plate by a crank mechanism;

FIGS. 28A and 28B are explanatory illustrations for explaining a second stage of operation of the cam-type automatic tool-exchanging apparatus shown in FIG. 21;

FIGS. 29A and 29B are explanatory illustrations for explaining a third stage of operation of the cam-type automatic tool-exchanging apparatus shown in FIG. 21;

FIGS. 33A and 33B are explanatory illustrations for explaining a seventh stage of operation of the cam-type automatic tool-exchanging apparatus shown in FIG. 21;

FIGS. 37A and 37B are explanatory illustrations for explaining an eleventh stage of operation of the cam-type automatic tool-exchanging apparatus shown in FIG. 21;

FIGS. 38A and 38B are explanatory illustrations for explaining a twelfth stage of operation of the cam-type automatic tool-exchanging apparatus shown in FIG. 21;

FIGS. 39A and 39B are explanatory illustrations for explaining one effect in the shown embodiment;

DETAILED DESCRIPTION OF THE INVENTION

At least the following matters will be made clear by the explanation in the present specification and the description of the accompanying drawings.

First Embodiment

Figure 1:
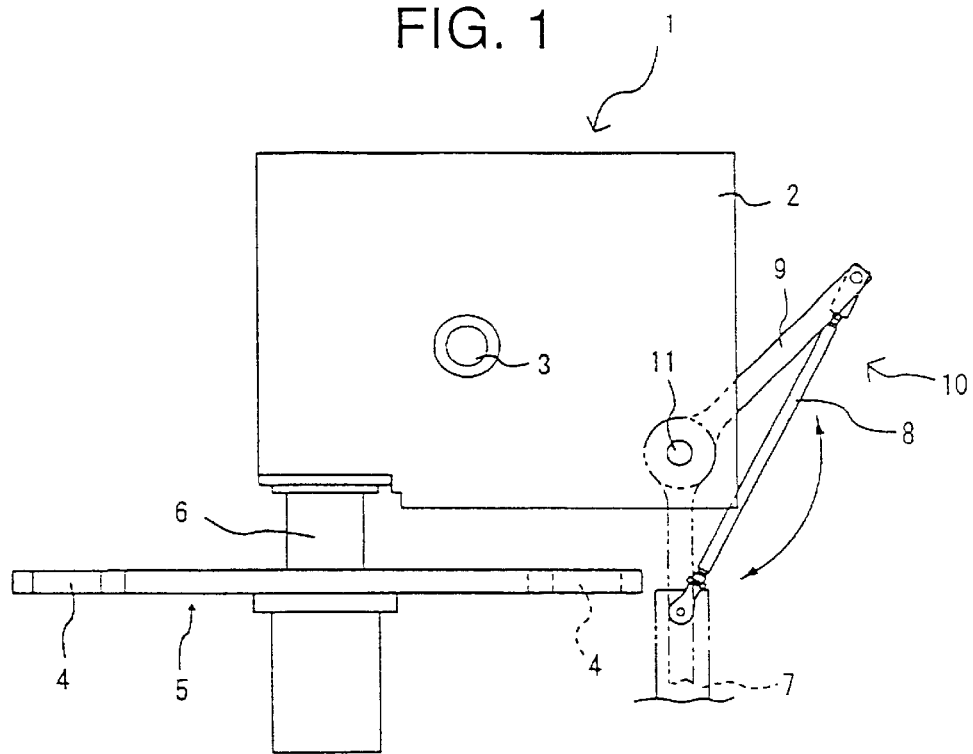
FIG. 1 is a schematic side elevation showing the preferred embodiment of a cam-type automatic tool-exchanging apparatus having a shutter-driving mechanism according to the present invention.
Figure 2:
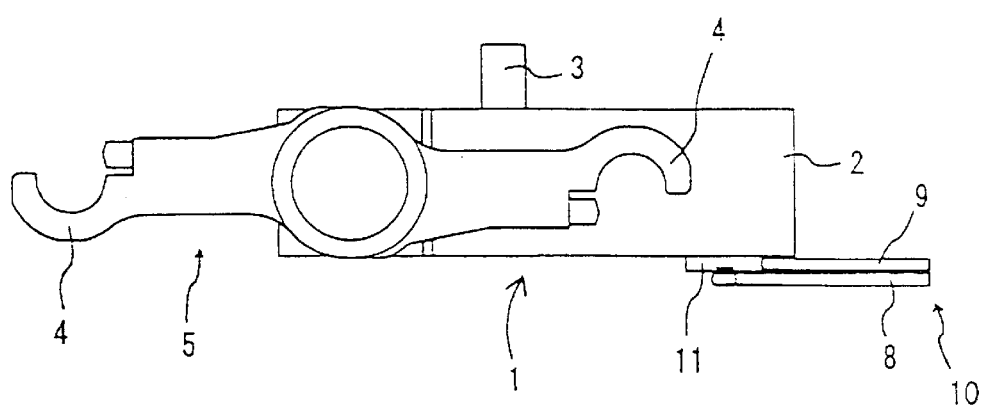
FIG. 2 is a schematic bottom view of the cam-type automatic tool-exchanging apparatus shown in FIG. 1.

Below, detailed explanation will be made, with reference to the accompanying drawings, of one embodiment of a cam-type automatic tool-exchanging apparatus comprising a shutter-driving mechanism of the present invention. As shown in FIGS. 1 and 2, in a housing 2 of a cam-type automatic tool-exchanging apparatus 1, there are provided: an input rotary shaft 3 rotatingly driven by a driving source, such as a not-shown motor or so forth; an output shaft 6 driving a tool-exchanging arm 5, the tool-exchanging arm 5 being located outside of the housing 2 and having grips 4 at both ends for gripping tools to perform tool-exchanging operation; and, a shutter-driving rotary shaft 11 driving a rotating arm 9 of a crank mechanism 10, the crank mechanism 10 being formed by coupling the rotating arm 9 and a stroke rod 8 connected to a shutter 7 provided outside of the housing 2, and the crank mechanism 10 being capable of performing opening/closing operation of the shutter 7. Thus, by rotatingly driving the input rotary shaft 3, tool-exchanging operation and opening/closing operation of the shutter 7 can be perform simultaneously.

Figure 3:
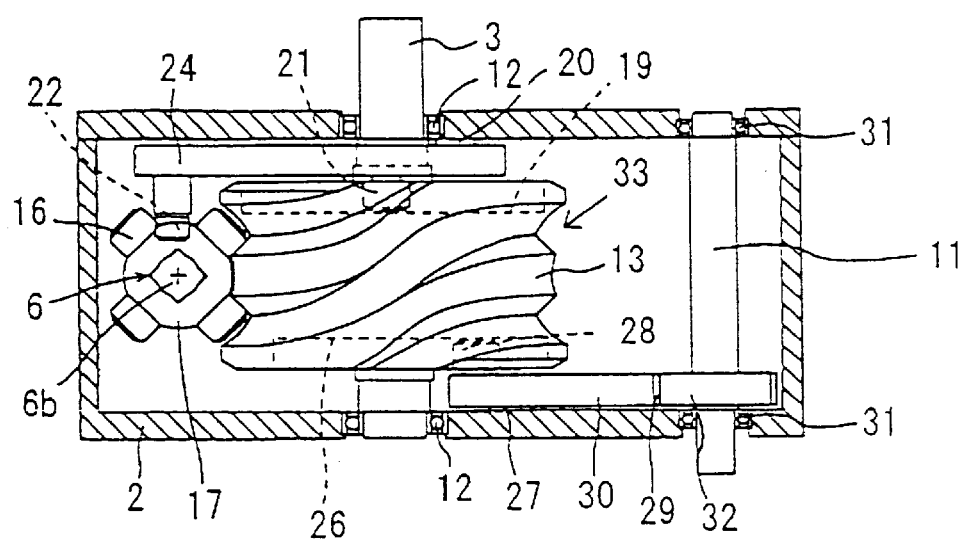
FIG. 3 is a bottom sectional view of the cam-type automatic tool-exchanging apparatus shown in FIG. 1.
Figure 4:
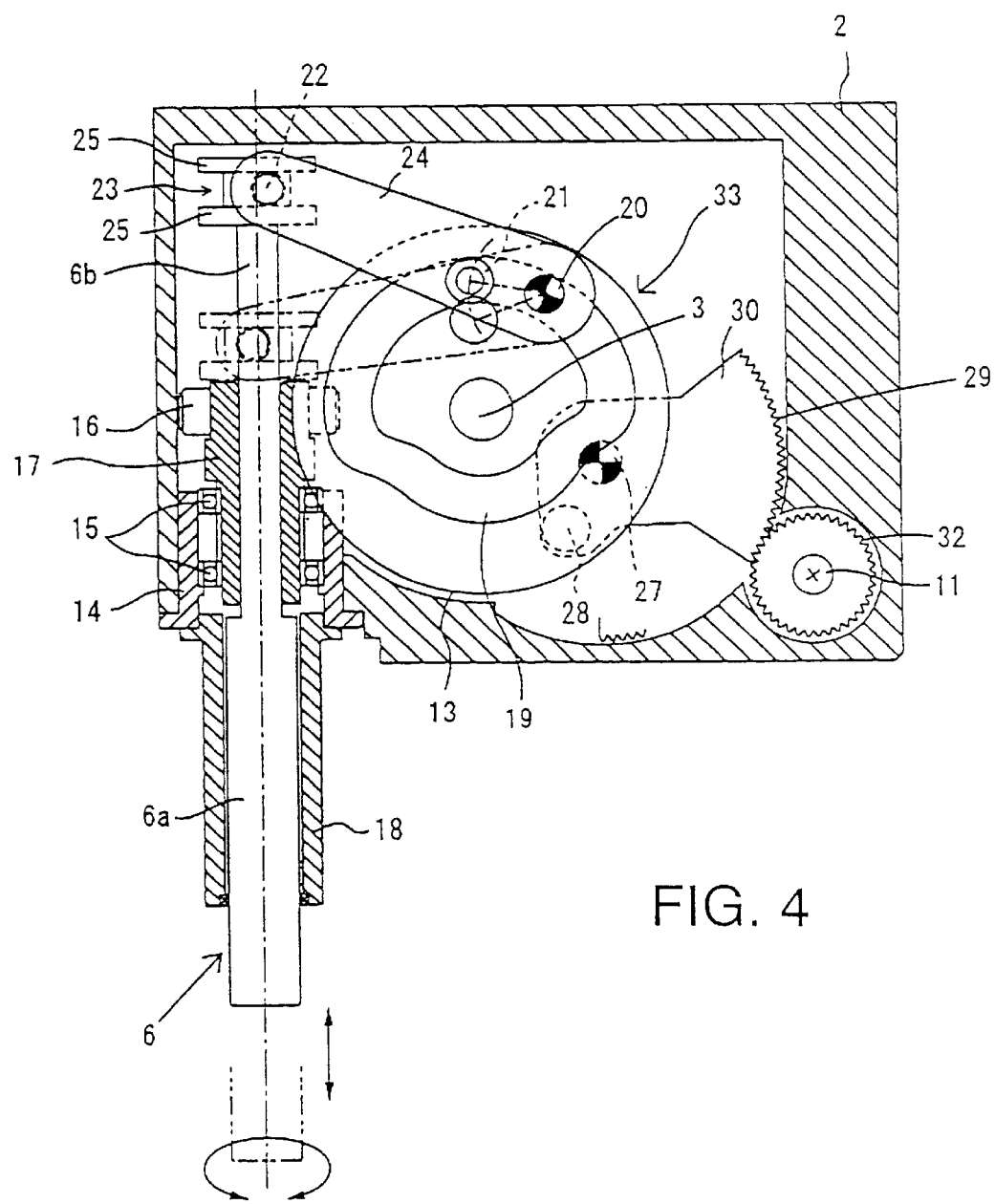
FIG. 4 is a front sectional view of the cam-type automatic tool-exchanging apparatus shown in FIG. 1.
Figure 5:
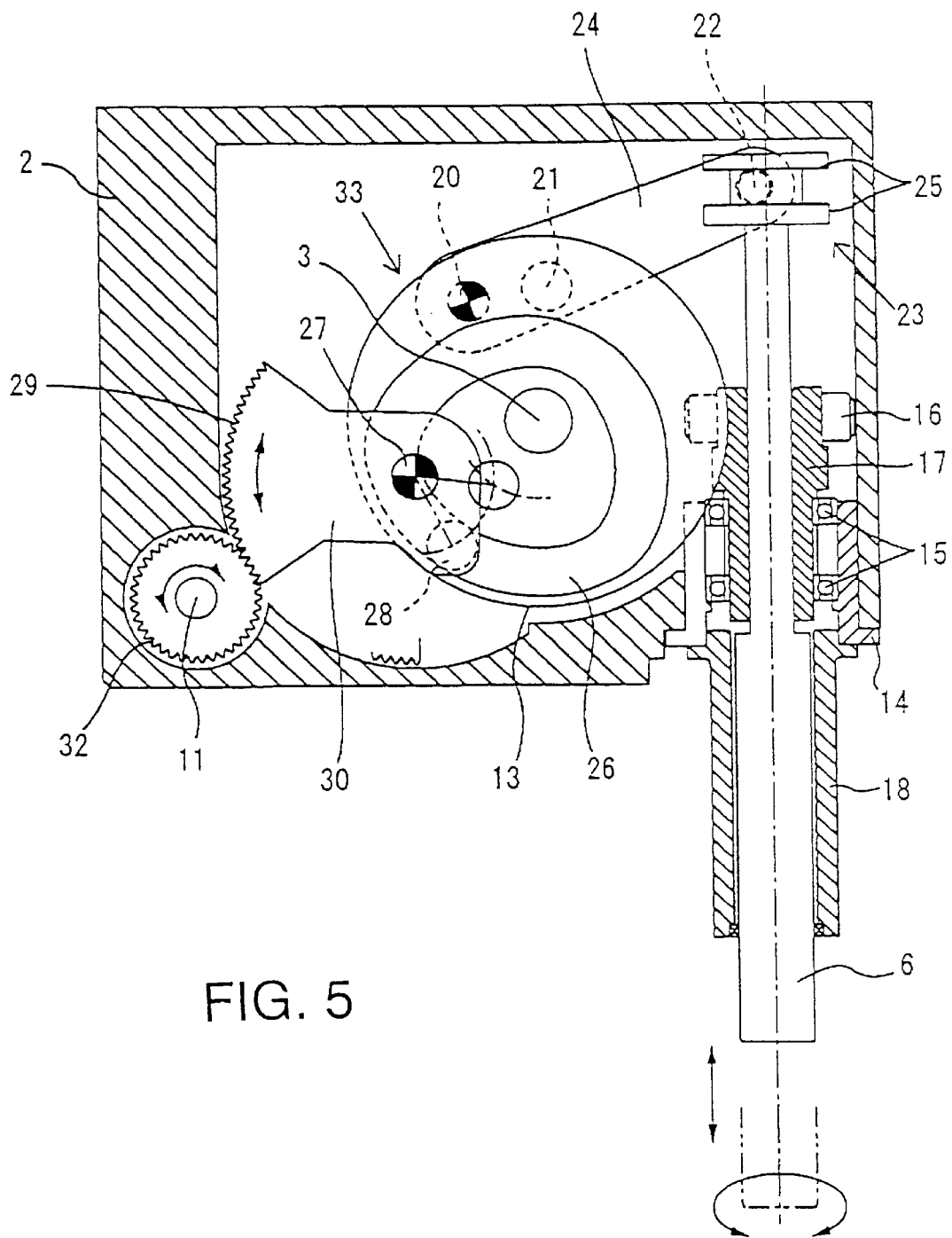
FIG. 5 is a rear sectional elevation of the cam-type automatic tool-exchanging apparatus shown in FIG. 1.

In FIGS. 3 and 4, there is mainly illustrated a mechanism section for performing the tool-exchanging operation. Within a housing 2 storing a lubricant oil therein, there are provided: a single input rotary shaft 3 rotatably supported at both ends by bearings 12; a roller cam gear 13 provided on the input rotary shaft 3 and is rotated integrally with the shaft 3 to convert the rotation of the shaft of the input rotary shaft 3 into a rotary motion (oscillating indexing motion) necessary for tool-exchanging operation and output the rotary motion; a cylindrical turret 17 rotatably supported via a bearing 15 within a cylindrical member 14 mounted on the housing 2, and engaged with the roller gear cam 13 via a cam follower 16 for rotation; the output shaft 6 having a tip end portion 6a rotatably and slidably inserted within a cylindrical guide member 18 mounted on the cylindrical member 14, and having a base end portion 6b inserted within the turret 17 splined with the turret 17 in a manner so as to permit axial sliding motion while restricting rotary motion; a lifting/lowering grooved cam 19 formed on one end face of the roller gear cam 13 and outputting a lifting/lowering motion necessary for tool-exchanging operation from the rotary motion of the input rotary shaft 3; and, a lifting/lowering arm 24 pivotally supported on the housing 2 by a support pin 20, engaged with the lifting/lowering grooved cam 19 via a first lifting/lowering cam follower 21 and engaged with an annular engaging portion 23 formed in the output shaft 6 via a second lifting/lowering cam follower 22.

In the shown embodiment, on the turret 17, four rotating cam followers 16 are rotatably mounted in spaced apart relationship along the circumferential direction. The spline engagement between the turret 17 and the base end portion 6b of the output shaft 6 is established by forming the inner periphery of the turret 17 and the outer periphery of the base end portion 6b of the output shaft 6 in quadrangular shape. The first and second lifting/lowering cam followers 21 and 22 are rotatably mounted on the lifting/lowering arm 24. The annular engaging portion 23 of the output shaft 6 is constructed with a pair of flanges 25 sandwiching the second lifting/lowering cam follower 22. The roller gear cam 13 engaged with the rotary turret 17 via the rotating cam follower 16 serves as a rotational-motion converting cam. The lifting/lowering grooved cam 19 engaged with the pivotal lifting/lowering arm 24 via the first lifting/lowering cam follower 21 serves as a lifting/lowering-motion producing cam.

The turret 17 rotated by the roller gear cam 13 rotates the output shaft 6 splined therewith for pivotally driving the tool-exchanging arm 5 mounted on the output shaft 6. On the other hand, the lifting/lowering arm 24 made to pivot by the lifting/lowering grooved cam 19 slidingly drives the output shaft 6, which is splined with the turret 17, in view of the turret and the guide member 18 in order to lift the tool-exchanging arm 5 mounted on the output shaft 6. The annular engaging portion 23 cooperating with the second lifting/lowering cam follower 22 of the lifting/lowering arm 24 which performs only pivoting motion relative to the rotating output shaft 6 can be rotated together with the rotary shaft 6 while clamping the second lifting/lowering cam follower 22. Thus, the output shaft 6 can be slid by the lifting/lowering arm 24 without interfering rotation of the output shaft 6.

The tool-exchanging arm 5 mounted on the output shaft 6 performs tool-exchanging operation by rotating motion and lifting/lowering motion of the output shaft 6 caused by the roller gear cam 13 and the lifting/lowering grooved cam 19, both rotatingly driven by rotation of the input rotary shaft 3.

On the other hand, in FIGS. 3 and 5 to 7, there is mainly shown a mechanism section for carrying out opening/closing operation of the shutter 7. This mechanism comprises: an opening/closing grooved cam 26 formed on an end surface of the roller gear cam 13 on the opposite surface where the lifting/lowering grooved cam 19 is formed, and outputting a shutter opening/closing pivotal motion necessary for opening/closing operation of the shutter 7 from rotation of the input rotary shaft 3; an opening/closing pivotal arm 30 that is pivotally supported on the housing 2 via a support pin 27, provided with a rotatable opening/closing cam follower 28 engaged with the opening/closing grooved cam 26 at one end and a sector gear 29 on the other pivotal end, rotatably supported to the housing 2 at both ends through bearings 31, and passing throughout the housing 2; and a driven gear 32 provided on the shutter-driving rotary shaft 11 and meshed with the sector gear 29 for rotatingly driving the shutter-driving rotary shaft 11.

Accordingly, in the shown embodiment, the roller gear cam 13, the lifting/lowering grooved cam 19, and the opening/closing grooved cam 26 are provided on a single cam body 33 mounted on the single input rotary shaft 3. Accordingly, the size of the housing 2 receiving the mechanism components can be made small to contribute for downsizing of the overall apparatus 1, and in conjunction therewith, high operation accuracy and high operation stability can be certainly provided. However, it is of course possible to form the cams 13, 19 and 26 on separate cam bodies and then mount these on the single input rotary shaft 3.

The opening/closing grooved cam 26 engaged with the pivotal opening/closing pivotal arm 30 via an opening/closing cam follower 28 serves as an opening/closing-motion generating cam for causing pivoting motion for opening/closing the shutter. The opening/closing grooved cam 26 pivotally drives the sector gear 29 by causing the opening/closing pivotal arm 30 to pivotally reciprocate. The driven gear 32 in rotated in the forward and reverse direction by pivotal reciprocating motion of the sector gear 29. The forward and reverse rotation of the driven gear 32 is transmitted to the shutter-driving rotary shaft 11. The shutter-driving rotary shaft 11 outputs the shutter opening/closing pivotal motion as the forward and reverse rotating motion from inside of the housing 2 to the outside.

The shutter-driving rotary shaft 11 connected to the shutter 7 via the crank mechanism 10 causes opening/closing operation of the shutter 7 in accordance with the tool-exchanging operation by the shutter-opening/closing pivotal motion having been output from the opening/closing grooved cam 26 that is rotatingly driven together with the roller gear cam 13 and the lifting/lowering grooved cam 19 which cause the tool-exchanging operation of the tool-exchanging arm 5.

Figure 6:
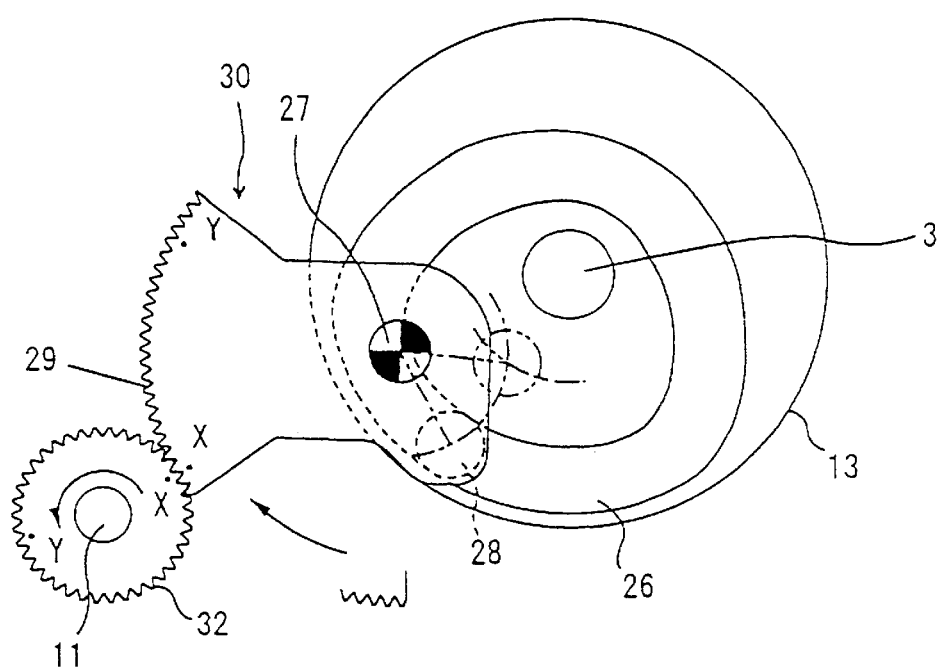
FIG. 6 is an explanatory view showing a mechanism including portions from an opening/closing grooved cam to a driven gear to be applied to the cam-type automatic tool-exchanging apparatus of FIG. 1.
Figure 7:
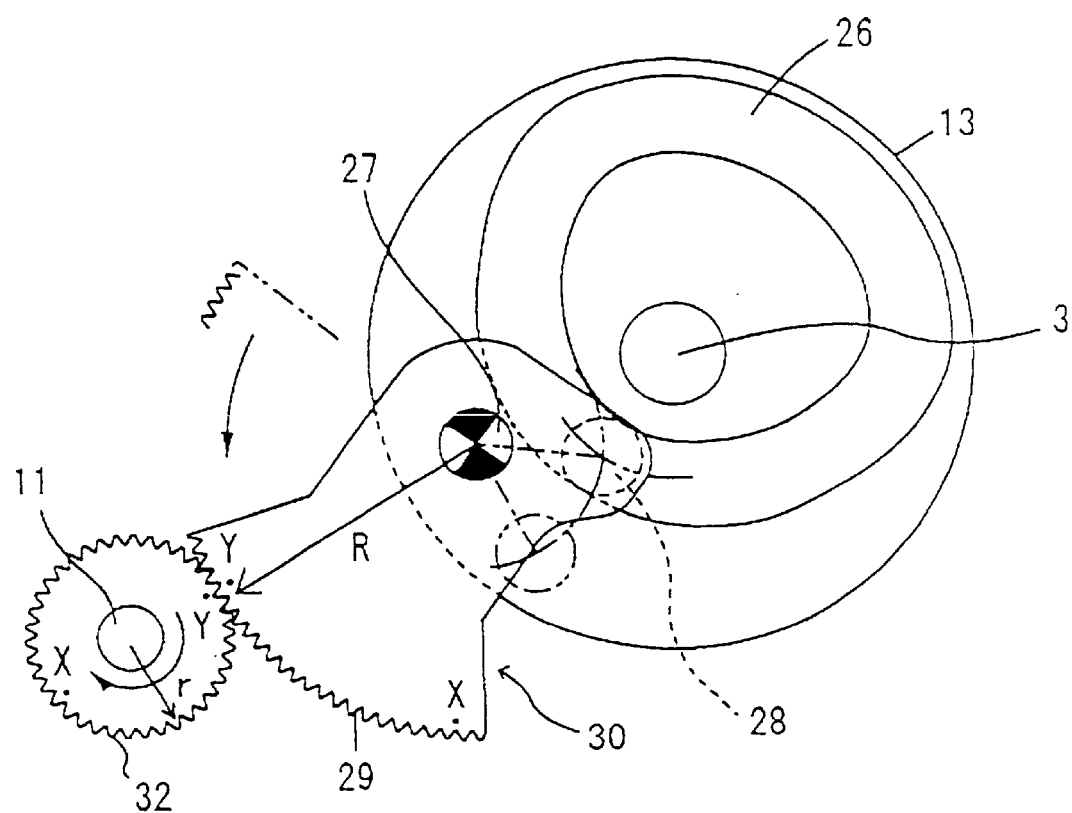
FIG. 7 is an explanatory illustration for explaining operation of the mechanism from the opening/closing grooved cam to the driven gear of FIG. 6.

Particularly, the cam profile of the opening/closing grooved cam 26 for driving the sector gear 29 for pivoting motion is set with consideration to the gear ratio between the sector gear 29 and the driven gear 32, so that the driven gear 32 and thus the shutter-driving rotary shaft 11 will rotate in the forward and reverse direction within a range of 180° (shown as a range between point X and point Y in the figure) to thus cause the shutter 7 to open/close once by the reciprocating and pivoting motion of the pivoting arm 9 of the crank mechanism 10 within a range of a maximum of 180°, that is, by the reciprocating and pivoting operation between the top dead point and the bottom dead point of the crank mechanism 10 at the most, as shown in FIGS. 6 and 7.

Particularly, the turning radius R of the sector gear 29 is greater than the turning radius r of the driven gear 32. By this, the driven gear 32 can be rotated over a greater range in angle with the pivoting motion of the sector gear 29 having a smaller range in angle, and the range of rotation angle of the shutter-driving rotary shaft 11 can be made greater than the range of pivoting angle of the opening/closing pivotal arm 30. Accordingly, it is possible to output a rotation having a large range of rotation angle to the shutter-driving rotary shaft 11 while making the housing 2 that receives the pivoting opening/closing pivotal arm 30 compact.

As shown in FIG. 8, the shutter 7 is connected to the shutter-driving rotary shaft 11 of FIG. 1 via the stroke rod 8 of the crank mechanism 10. This shutter 7 is slidably supported on slide guides 34 at both ends. By this, the shutter 7 forms a slider crank mechanism 35 together with the crank mechanism 10. While the slider crank mechanism (or, piston cylinder mechanism) 35 has a simple structure, it has been proven that such a mechanism accomplishes high-speed operation of, for example, about 20 r.p.s. in an automotive engine; and thus, such a mechanism can fully comply with the high-speed tool-exchanging operation within a range of 0.5 to 1 second in the shown embodiment of the cam-type automatic tool-exchanging apparatus 1. On the other hand, by enlarging the crank mechanism 10 including the rotating arm 9, the opening/closing stroke of the shutter 7 can be set to be sufficiently large while certainly achieving downsizing of the housing 2.

Figure 20:
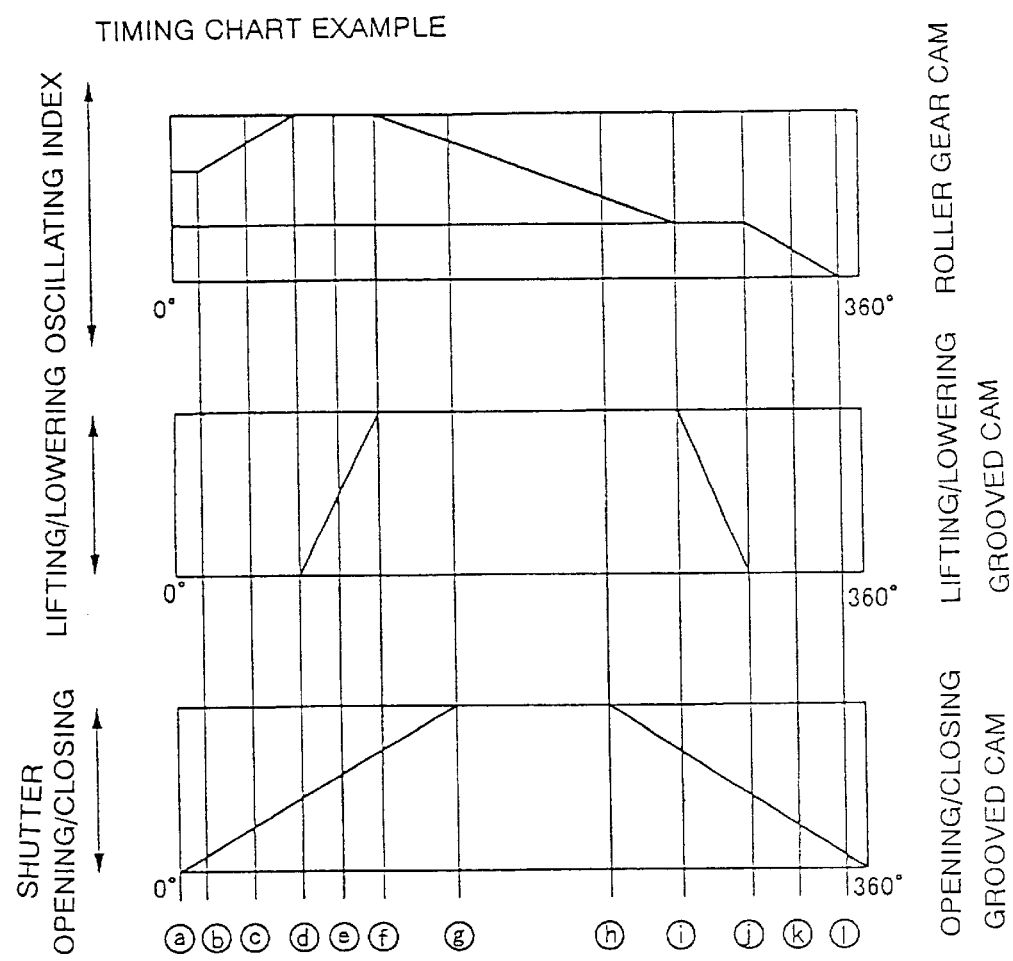
FIG. 20 is a timing chart of rotary motion and lifting/lowering motion of an output shaft, and rotary motion of a shutter-driving rotary shaft caused by a roller gear cam, a lifting/lowering grooved cam, and an opening/closing grooved cam of the cam-type automatic tool-exchanging apparatus shown in FIG. 1.

Operation of the shown embodiment of the cam-type automatic tool-exchanging apparatus 1 constructed as set forth above will be discussed with reference to one example of a timing chart as shown in FIG. 20. FIG. 20 is an example of a timing chart showing the rotary (oscillating index) motion and lifting/lowering motion of the output shaft 6, and the rotary motion of the shutter-driving rotary shaft 11 caused by a roller gear cam 13, a lifting/lowering grooved cam 19, and an opening/closing grooved cam 26.

In the tool-exchanging operation of the shown embodiment, the tool-exchanging arm 5 in its initial condition (timing (a) to (b) in FIG. 20) is at first pivoted over 90°. By this, one of the grip 4 grips a used tool Ta set on a main shaft of a not shown machine tool, and at the same time, the other grip 4 grips a tool Tb for replacement which is set in a not shown tool magazine (timing (b) to (d) in FIG. 20).

Next, the tool-exchanging arm 5 is lifted-down (or lowered) in one direction at the present angular position. By this lifting/lowering motion, the replacement tool Tb is withdrawn from the tool magazine, and the used tool Ta is removed from the main shaft of the machine tool (timing (d) to (f) in FIG. 20).

Then, the tool-exchanging arm 5 is pivoted over 180° in opposite direction while maintaining the lifted-down (or lowered) position. Accordingly, the replacement tool Tb is placed on the side of the main shaft of the machine tool, whereas the used tool Ta is placed on the side of the tool magazine (timing (f) to (i) in FIG. 20).

Then, the tool-exchanging arm 5 is lifted in the opposite direction while maintaining the present angular position. Accordingly, the replacement tool Tb is set to the main shaft and the used tool Ta is returned to the tool magazine (timing (i) to (j) in FIG. 20).

Finally, while maintaining the present lifted position, the tool-exchanging arm 5 is pivoted over 90° in the same direction as the above-mentioned 180° pivoting. By this, respective grips 4 are moved away from the tools Ta and Tb, and the tool-exchanging arm 5 is returned to the initial position (timing (j) to (l) of FIG. 20).

This tool-exchanging operation is achieved by one turn of the input rotary shaft 3 over 360°. Then, in conjunction with this 360°-turn of the input rotary shaft 3, the shutter 7 is opened and closed once.

When the tool-exchanging arm 5 is in its initial condition, the shutter 7 starts to move in advance of the tool-exchanging operation (timing (a) on in FIG. 20). The shutter 7 is fully opened right before the tool-exchanging arm 5, which has started the 180° pivoting to transfer the tools Ta and Tb, passes across the position of the shutter 7 for the first time (the timing (g) in FIG. 20). The fully-opened condition of the shutter 7 is maintained until the tool-exchanging arm 5 being pivoted 180° passes across the position of the shutter 7 for the second time (the timing (g) to (h) of FIG. 20). Immediately after the tool-exchanging arm 5 passes across the position of the shutter 7, the shutter 7 starts to close (from the timing (h) on in FIG. 20). After the tool-exchanging arm 5 returns to its initial position, the shutter 7 is fully closed (the timing (l) to 360° in FIG. 20).

The correlation of the tool-exchanging operation of the tool-exchanging arm 5 and the opening/closing operation of the shutter 7, according to the timing chart shown in FIG. 20, will be discussed hereinafter with reference to FIGS. 8 to 19.

Figure 8A:
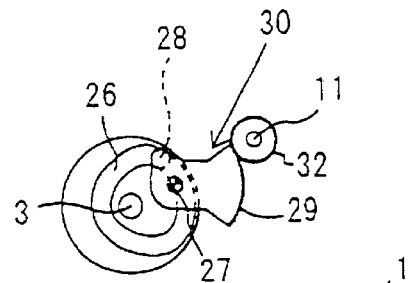
FIG. 8 is an explanatory illustration for explaining a first stage of operation of the cam-type automatic tool-exchanging apparatus shown in FIG. 1.
Figure 8B:
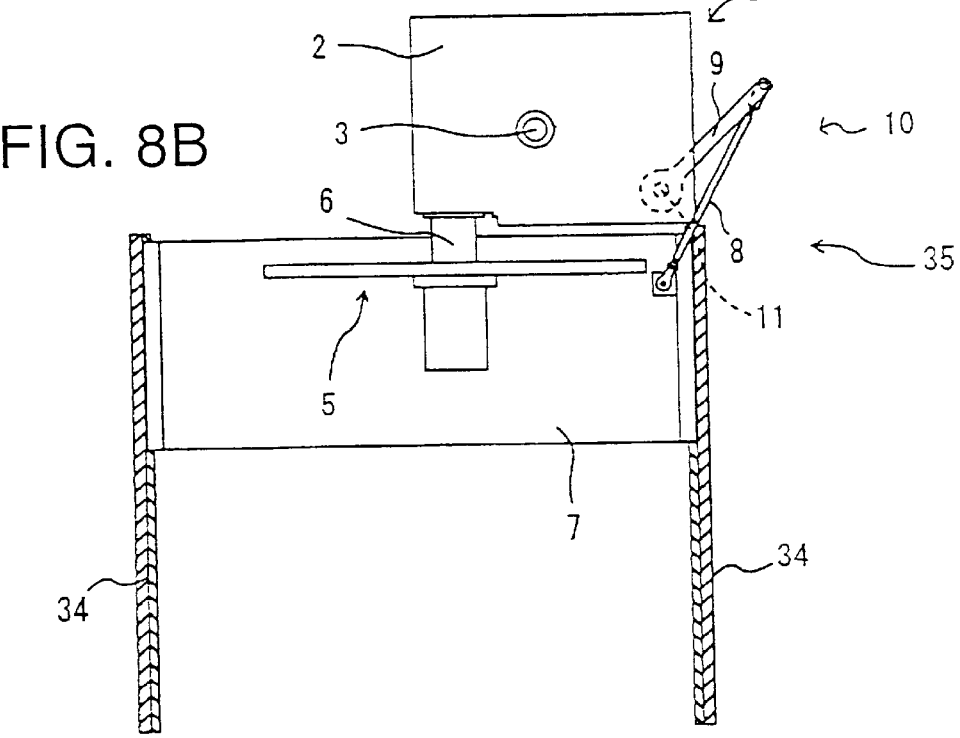
Figure 8C:
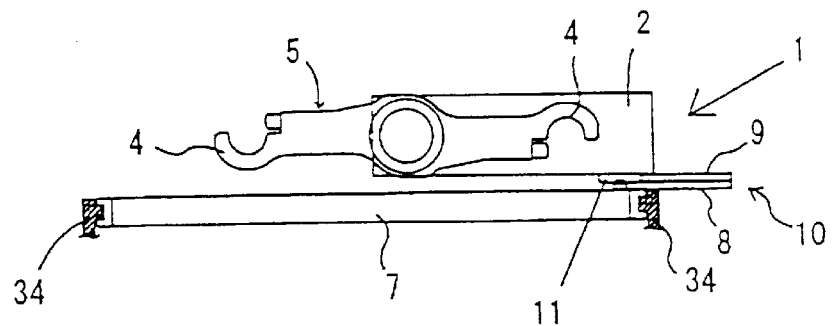

In the first stage (a) as shown in FIGS. 8A to 8C, one end of the sector gear 29 is meshed with the driven gear 32. The crank mechanism 10 is placed in bent condition and in the vicinity of bottom dead center. By this, the shutter 7 is held closed, and the tool-exchanging arm 5 is placed in initial condition in parallel to the shutter 7.

In the second stage (b) as shown in FIGS. 9A and 9B, the shutter-driving rotary shaft 11 starts to rotate, and the crank mechanism 10 starts to expand to start opening of the shutter 7.

Figure 10A:
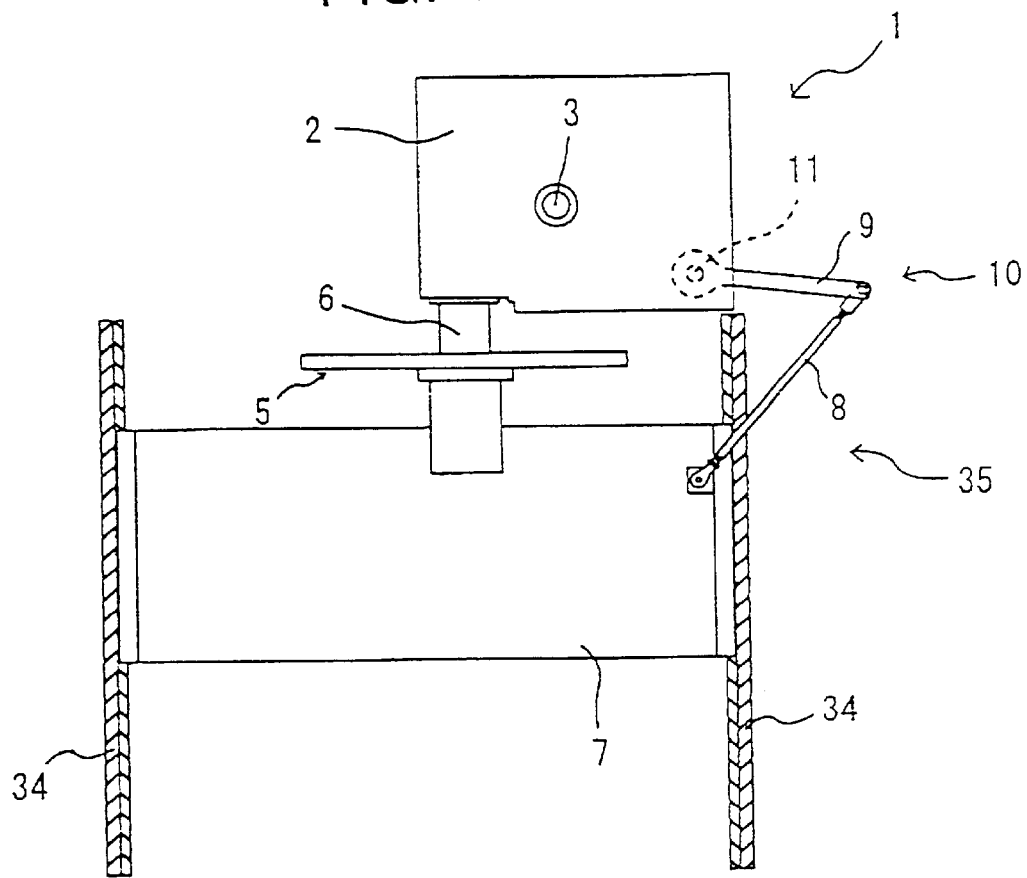
FIG. 10 is an explanatory illustration for explaining a third stage of operation of the cam-type automatic tool-exchanging apparatus shown in FIG. 1.
Figure 10B:
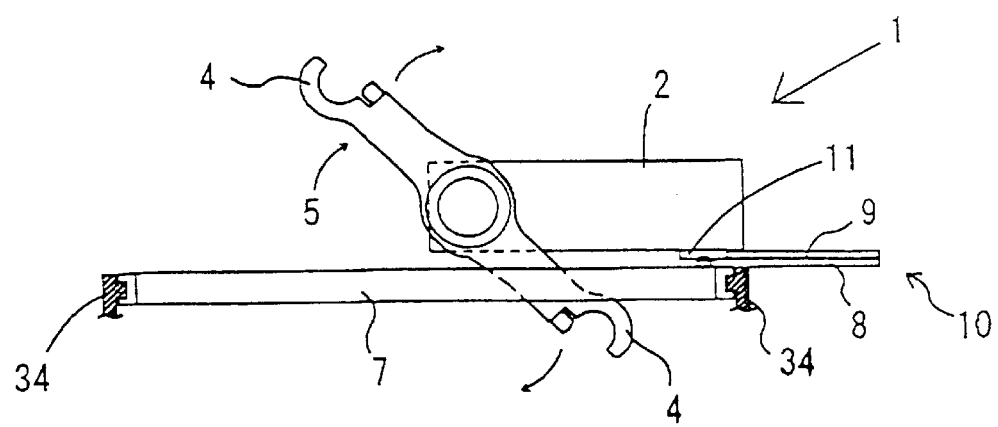

In the third stage (c) as shown in FIGS. 10A and 10B, the shutter 7 continues movement in the opening direction to be lowered below the height of the tool-exchanging arm 5, and in conjunction therewith, the tool-exchanging arm 5 that has started its 90°-pivotal motion obliquely moves across the shutter position toward the main shaft of the machine tool, on which the used tool is installed.

Figure 11A:
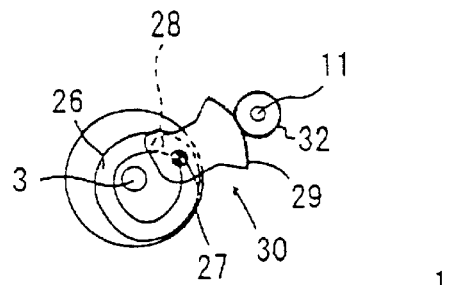
FIG. 11 is an explanatory illustration for explaining a fourth stage of operation of the cam-type automatic tool-exchanging apparatus shown in FIG. 1.
Figure 11B:
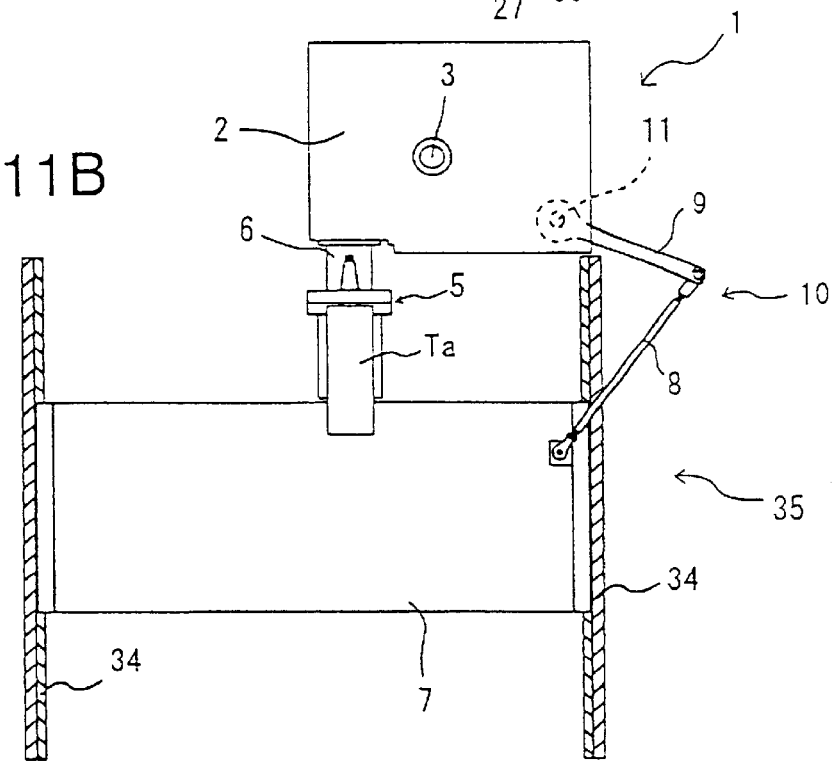
Figure 11C:
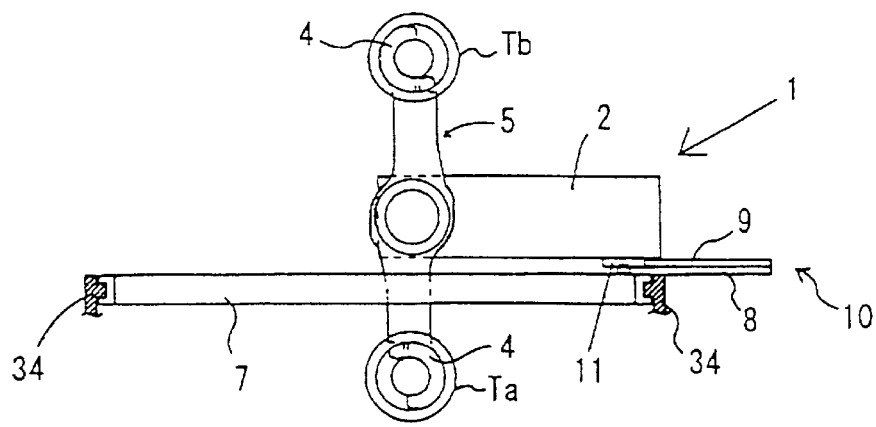

In the fourth stage (d) shown in FIGS. 11A to 11C, the substantially center portion of the sector gear 29 is meshing with the driven gear 32. The crank mechanism 10 continues expanding so that the shutter 7 continues to move in the opening direction. In conjunction therewith, the tool-exchanging arm 5 completes the 90°-pivotal motion and thus perpendicularly extends across the shutter position. Here, the tool-exchanging arm 5 grips the used tool Ta and the replacement tool Tb.

In the fifth stage (e) shown in FIGS. 12A and 12B, the shutter 7 continues motion in the opening direction. On the other hand, the tool-exchanging arm 5 that has started lifting-down (lowering) operation continues to move downward to withdraw the used tool Ta and the replacement tool Tb.

In the sixth stage (f) shown in FIGS. 13A and 13B, the crank mechanism 10 continues its expanding motion to drive the shutter 7 in the opening direction. On the other hand, the tool-exchanging arm 5 completes its lifting-down (lowering) motion to completely withdraw the tools Ta and Tb respectively from the main shaft and the tool magazine.

Figure 14A:
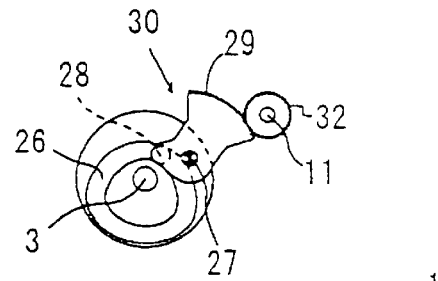
FIG. 14 is an explanatory illustration for explaining a seventh stage of operation of the cam-type automatic tool-exchanging apparatus shown in FIG. 1.
Figure 14B:
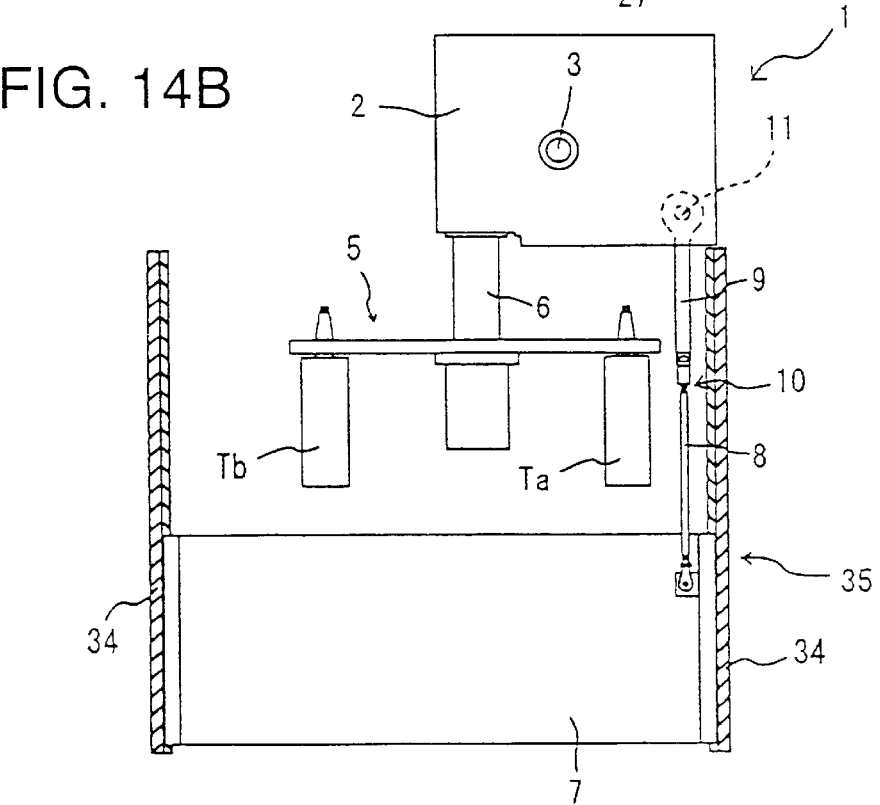
Figure 14C:
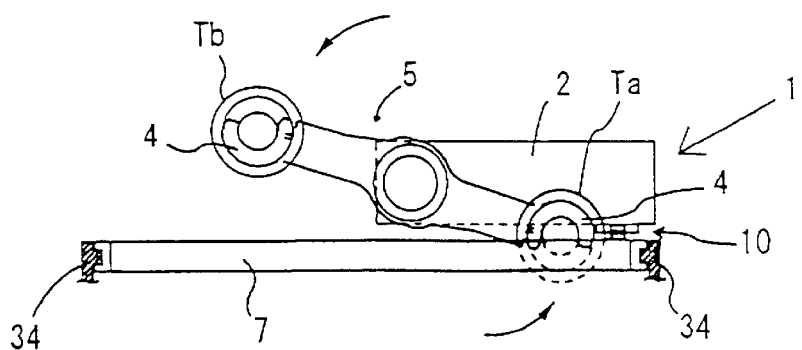

In the seventh stage (g) shown in FIGS. 14A to 14C, the other end of the sector gear 29 meshes with the driven gear 32, and the crank mechanism 10 is in its fully-expanded condition to reach the top dead center. By this, the shutter 7 is placed in fully-opened condition to permit the tools Ta and Tb to pass across the shutter 7. Here, the tool-exchanging arm 5 that has initiated its 180°-pivotal motion approaches the shutter position for the first time, and the used tool Ta is moved to the tool magazine side.

In the eighth stage (h) shown in FIGS. 15A and 15B, the shutter 7 is held in its fully-open condition. On the other hand, the tool-exchanging arm 5 pivoting over 180° moves across the shutter position for the second time so as to insert the replacement tool Tb into the main shaft of the machine tool.

In the ninth stage (i) shown in FIGS. 16A and 16B, the crank mechanism 10 has initiated its folding operation caused by the shutter-driving rotary shaft 11 initiating rotation in the reverse direction. Thus, the shutter 7 starts to move in the closing direction. The tool-exchanging arm 5 completes its pivotal motion over 180° to extend perpendicularly across the shutter position.

Figure 17A:
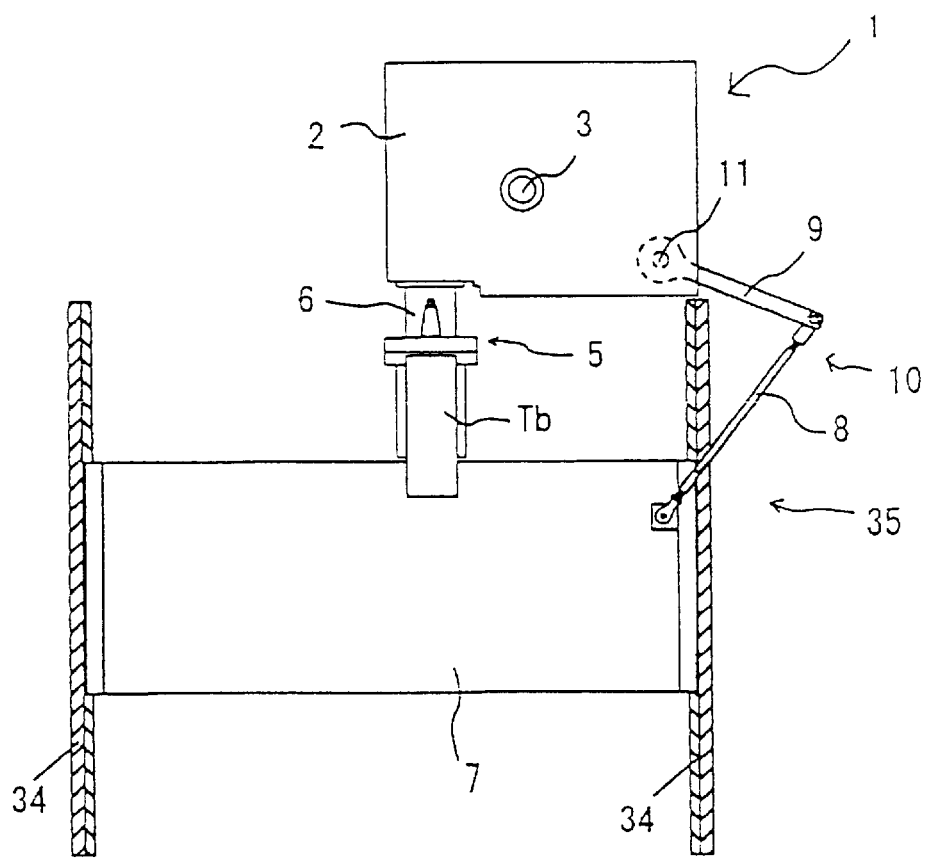
FIG. 17 is an explanatory illustration for explaining a tenth stage of operation of the cam-type automatic tool-exchanging apparatus shown in FIG. 1.
Figure 17B:
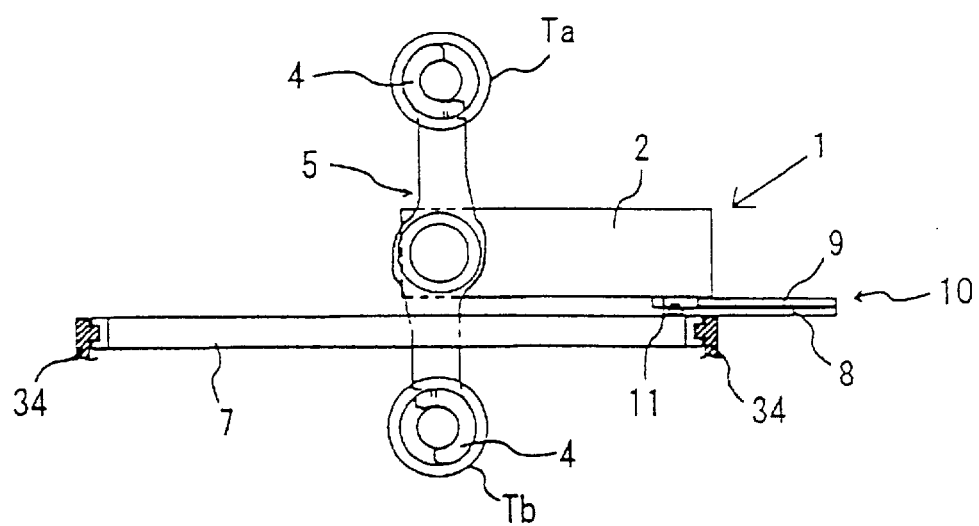

In the tenth stage (j) shown in FIGS. 17A and 17B, the shutter 7 continues motion in the closing direction. At the same time, the tool-exchanging arm 5, which is passing across the shutter position, is completely lifted up to set respective tools Ta and Tb to the tool magazine and the main shaft of the machine tool.

Figure 18A:
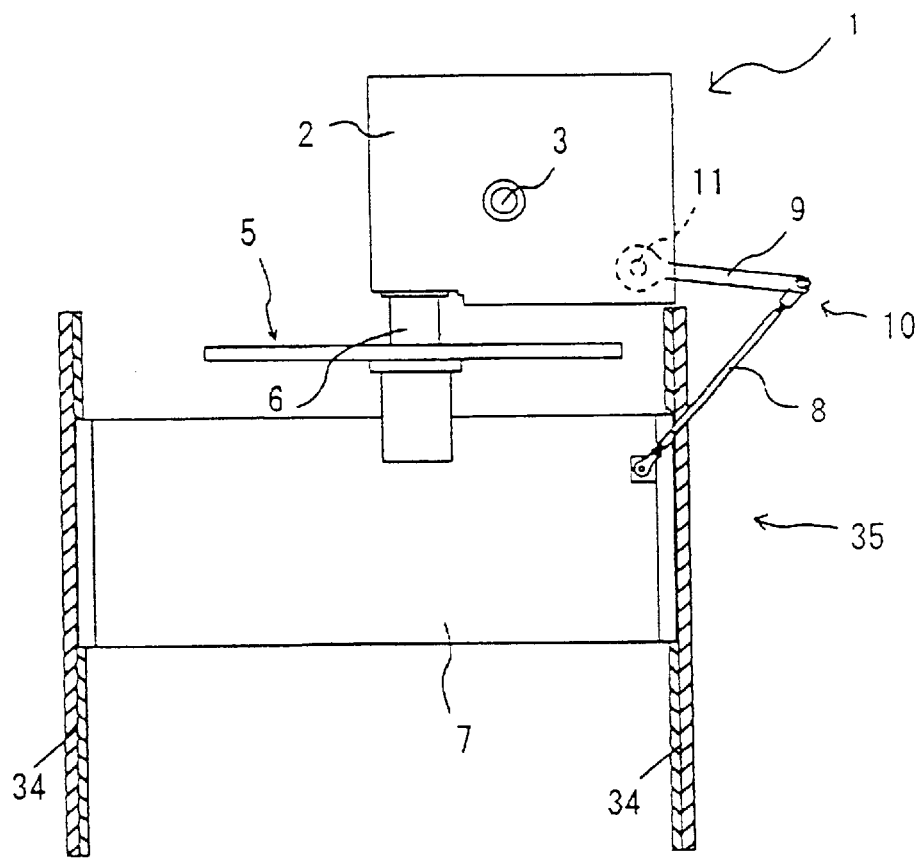
FIG. 18 is an explanatory illustration for explaining an eleventh stage of operation of the cam-type automatic tool-exchanging apparatus shown in FIG. 1.
Figure 18B:
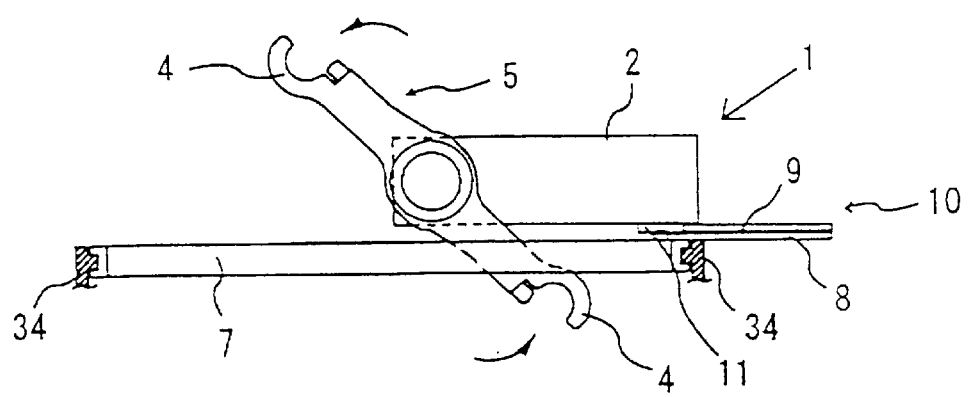

In the eleventh stage (k) shown in FIGS. 18A and 18B, the crank mechanism 10 continues its folding operation to drive the shutter 7 in the closing direction. The tool-exchanging arm 5 that has started pivotal motion over 90° to move away from the tools Ta and Tb moves obliquely across the shutter position that is in a closed condition still allowing this pivotal motion, to return to its initial position.

Figure 19A:
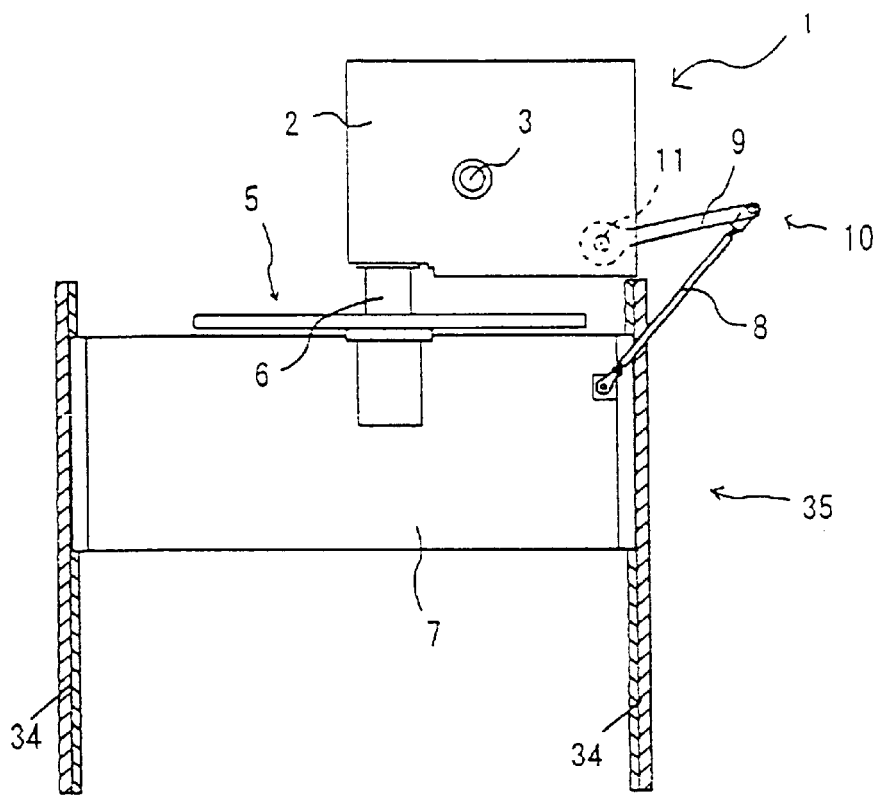
FIG. 19 is an explanatory illustration for explaining a twelfth stage of operation of the cam-type automatic tool-exchanging apparatus shown in FIG. 1.
Figure 19B:
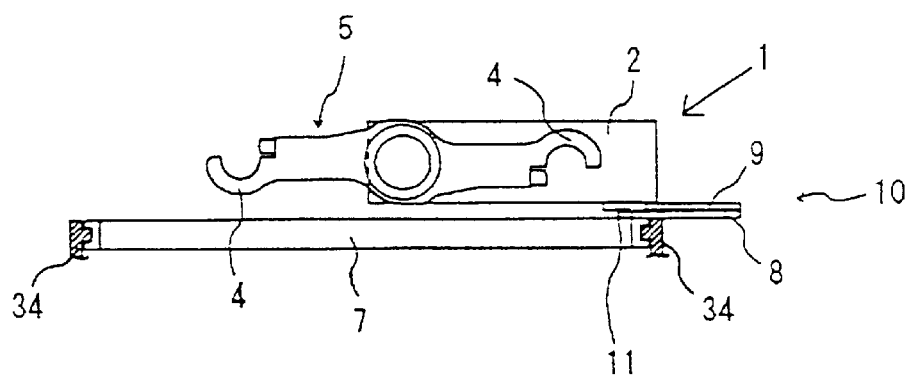

In the twelfth stage (l) shown in FIGS. 19A and 19B, the tool-exchanging arm 5 is completely returned to the initial position. In conjunction therewith, the shutter 7 is continuously driven toward the fully-closed condition. Finally, the tool-exchanging arm 5 and the shutter 7 are returned to the positions of the first stage (a) of FIGS. 8A to 8C.

As set forth above, the shown embodiment of the roller gear cam 13, the lifting/lowering grooved cam 19, and the opening/closing grooved cam 26 are formed with cam profiles for overlapping the tool-exchanging operation of the tool-exchanging arm 5 and the opening/closing operation of the shutter 7. Therefore, the tool-exchanging operation of the tool-exchanging arm 5 can be performed during the shutter opening/closing period in parallel. By this, it becomes possible to achieve speeding up of operation of the automatic tool-exchanging apparatus.

In the shown embodiment of the cam-type automatic tool-exchanging apparatus 1 having the structure as set forth above, the three cams 13, 19 and 26 can be driven by the single input rotary shaft 3. Namely, the shutter 7 can be driven by the input rotary shaft 3 that, on the other hand, drives the cams 13 and 19 of the automatic tool-exchanging apparatus. Thus, it becomes easy to synchronize the opening/closing operation of the shutter 7 to the tool-exchanging operation. At this time, within the housing 2, rotating operation or pivoting operation is mainly caused, and, pivotal motion for opening/closing the shutter 7 is outputted from the inside of the housing 2 to the outside thereof via the shutter-driving rotary shaft 11. Therefore, it becomes unnecessary to provide the opening/closing stroke of the shutter 7 within the housing 2, which thus prevents the apparatus 1 from becoming complicate in structure. Thus, it is possible to certainly synchronize the tool-exchanging operation and the shutter opening/closing operation in a short cycle period despite of the simple construction. Therefore, high-speed operation of the entire tool-exchanging operation including opening/closing operation of the shutter 7 can be certainly achieved.

As set forth above, since the tool-exchanging operation and the opening/closing operation of the shutter 7 can be certainly synchronized, it is possible to resolve the conventional problem in that, for example, until the opening/closing stroke of the shutter is confirmed, and particularly, until the "opening" of the shutter is confirmed, the tool-exchanging operation by the tool-exchanging arm cannot be initiated.

On the other hand, operation of the entire apparatus 1 can be unitarily performed by a mechanical power-transmission mechanism comprising, for example, the cams 13, 19 and 26, the gears 29 and 32, and the slider crank mechanism 35. Therefore, no uncertain action will be caused, and it is possible to ensure high reliability of the apparatus 1.

Particularly, by employing the cam mechanism and crank mechanism suitable for high-speed operation, timings of the tool-exchanging operation and the shutter opening/closing operation in a short cycle period can be accurately synchronized.

Furthermore, with the simple mechanisms such as the opening/closing grooved cam 26, the opening/closing pivotal arm 30, the sector gear 29, the driven gear 32, and the crank mechanism 10 including the rotating arm 9, it is possible to obtain the large, reversible pivotal motion from unidirectional rotating motion of the input rotary shaft 3 to efficiently produce reciprocating strokes necessary for the opening/closing action of the shutter 7.

Second Embodiment

Figure 21:
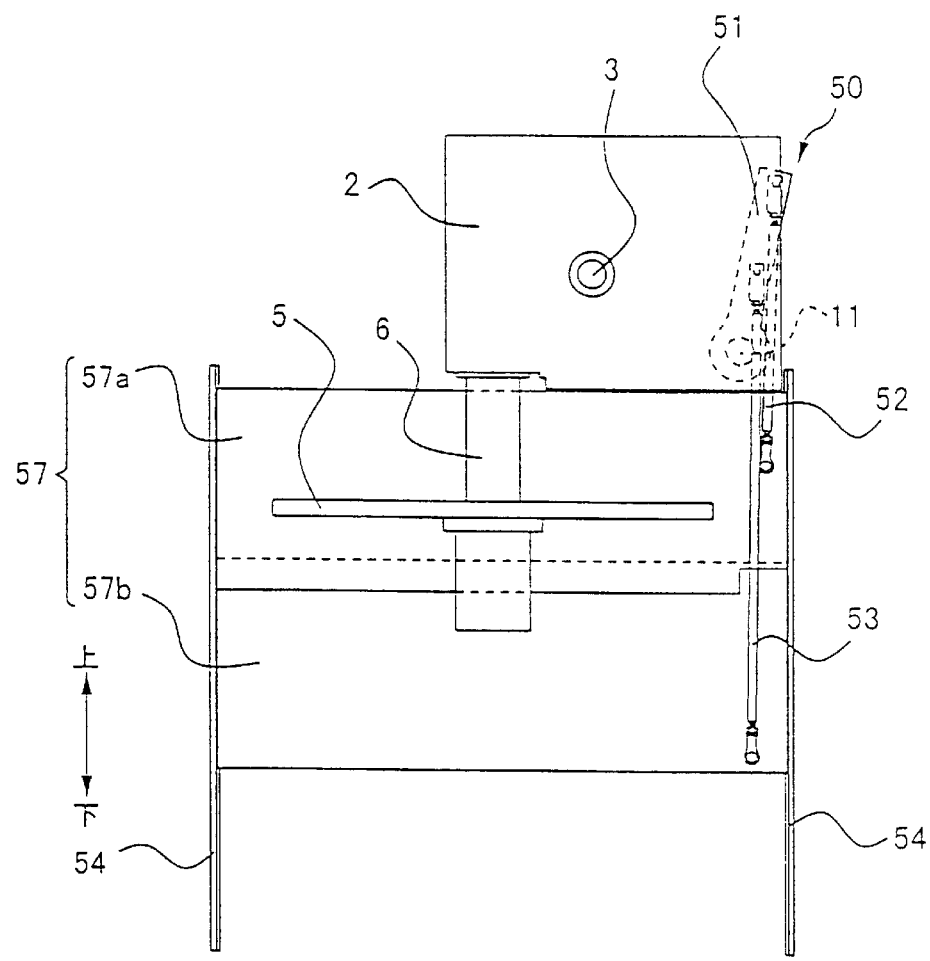
FIG. 21 is a schematic front elevation showing another preferred embodiment of the cam-type automatic tool-exchanging apparatus having the shutter-driving mechanism according to the present invention.
Figure 22:
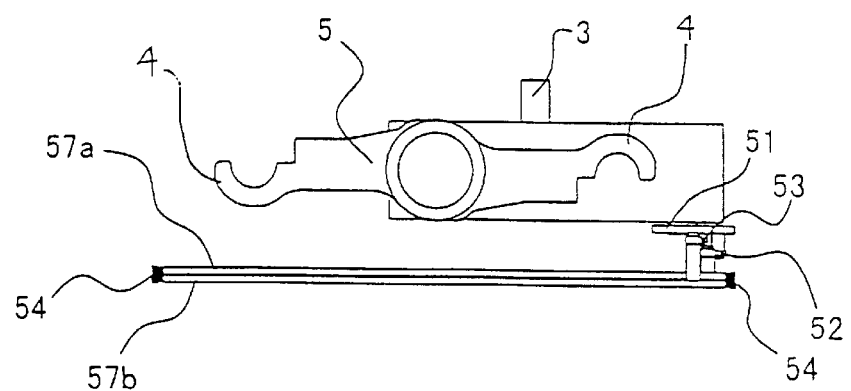
FIG. 22 is a schematic bottom view of the cam-type automatic tool-exchanging apparatus of FIG. 21.

Next, another preferred embodiment of the cam-type automatic tool-exchanging apparatus having the shutter-driving mechanism according to the present invention will be discussed with reference to the accompanying drawings. As shown in FIGS. 21 and 22, in the housing 2 of the cam-type automatic tool-exchanging apparatus 1 provided with the shutter-driving mechanism, there are provided: the input rotary shaft 3 rotatingly driven by a driving source, such as a not shown motor or so forth; the output shaft 6 for driving the tool-exchanging arm 5, the tool-exchanging arm 5 being located outside of the housing 2 and having grips 4 for gripping tools at both ends for performing tool-exchanging operation; and, the shutter-driving rotary shaft 11 for driving a rotating arm 51 of a crank mechanism 50, the crank mechanism 50 being formed by coupling the rotating arm 51 and stroke rods 52 and 53 that are respectively connected to a shutter 57 constructed with two shutter plates 57a and 57b provided outside of the housing 2, and the crank mechanism 50 being capable of making the shutter 57 open and close. Thus, by rotatingly driving the input rotary shaft 3, tool-exchanging operation and opening/closing operation of the shutter 57 can be performed simultaneously.

The mechanism section for causing the tool-exchanging operation is substantially as discussed in connection with the first embodiment with reference to FIGS. 3 and 4. Further, the mechanism section for opening and closing the shutter 57 is also substantially the same as the first embodiment, which is mainly shown in FIGS. 3 and FIGS. 5 to 7.

The shutter 57 is connected to the shutter-driving rotary shaft 11 of FIG. 21 via two long and short stroke rods 52 and 53 of the crank mechanism 50. The shutter 57 is slidably supported on slide guides 54 at both ends as shown in FIGS. 23A, 23B, 24A and 24B. By this, the shutter 57 forms a slider crank mechanism 55 together with the crank mechanism 50. While the slider crank mechanism (or, piston cylinder mechanism) 55 has a simple structure, it has been proven that such a mechanism accomplishes high-speed operation of, for example, about 20 r.p.s. in an automotive engine; and thus, such a mechanism can fully comply with the high-speed tool-exchanging operation within a range of 0.5 to 1 second of the cam-type automatic tool-exchanging apparatus 1 provided with the shutter-driving mechanism according to the shown embodiment. On the other hand, by enlarging the crank mechanism 50 including the rotating arm 51, the opening/closing stroke of the shutter 57 can be set to be sufficiently large while certainly achieving downsizing of the housing 2.

The preferred construction of the shutter 57 of the cam-type automatic tool-exchanging apparatus having the shutter-driving mechanism according to the present embodiment is constructed so that a region or space to be closed by the shutter 57 (hereinafter referred to as "closing region") is closeable by a first shutter plate 57a and a second shutter plate 57b, which are an example of plate members. The first shutter plate 57a and the second shutter plate 57b are formed to have substantially the same size. The two shutter plates 57a and 57b oppose each other and substantially overlap over their entire surface when in the opened condition, that is, in a retracted condition in which the first shutter plate 57a and the second shutter plate 57b are retracted to a retracting region, the retracting region being a region in which the shutter 57 retracts from the closing region. On the other hand, the first and second shutter plates 57a and 57b are arranged in side-by-side relationship in the sliding direction when in the closed state. Note that, in this closed state, the first and second shutter plates 57a and 57b partly overlap at their boundaries.

Figure 24A:
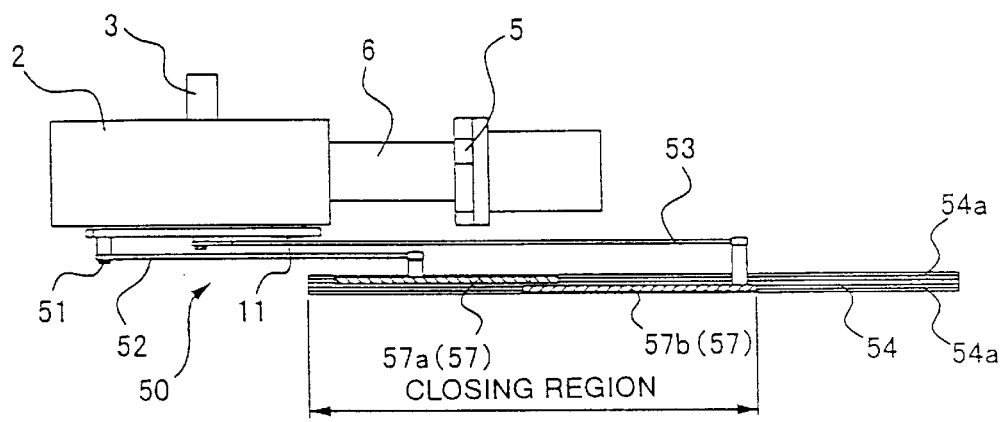
FIGS. 24A and 24B are explanatory illustrations for explaining a slide guide to be applied for the cam-type automatic tool-exchanging apparatus of FIG. 21.
Figure 24B:
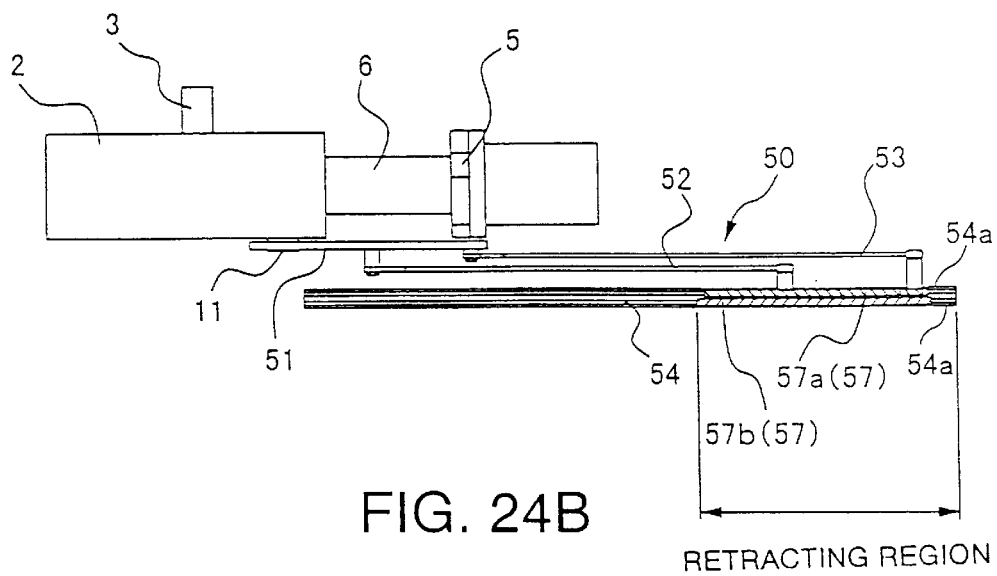

Therefore, the slide guides 54 supporting the two shutter plates 57a and 57b at both ends respectively comprise rail portions 54a corresponding to the shutter plates 57a and 57b as shown in FIG. 24A and FIG. 24B, so that the two shutter plates 57a and 57b are retracted in overlapping manner.

Here, the cam profile of the opening/closing grooved cam 26 for driving the sector gear 29 for pivoting motion is set with consideration to the gear ratio between the sector gear 29 and the driven gear 32 in a similar manner as the first embodiment, so that the driven gear 32 and thus the shutter-driving rotary shaft 11 will rotate in the forward and reverse direction within a range of 180° (shown as a range between point X and point Y in the figure) to thus cause the shutter 57 to open/close once by the reciprocating and pivoting motion of the pivoting arm 51 of the crank mechanism 50 within a range of a maximum of 180°, that is, by the reciprocating and pivoting operation between the top dead point and the bottom dead point of the crank mechanism 50 at the most, as shown in FIGS. 6 and 7. As in the first embodiment, the turning radius R of the sector gear 29 is greater than the turning radius r of the driven gear 32. By this, the driven gear 32 can be rotated over a greater range in angle with the pivoting motion of the sector gear 29 having a smaller range in angle, and the range of rotation angle of the shutter-driving rotary shaft 11 can be made greater the range of pivoting angle of the opening/closing pivotal arm 30. Accordingly, it is possible to output a rotation having a large range of rotation angle to the shutter-driving rotary shaft 11 while making the housing 2 that receives the pivoting opening/closing pivotal arm 30 compact.

FIGS. 25A, 25B, 26A and 26B are explanatory illustrations for explaining operation of the shutter 57 by the crank mechanism 50. FIGS. 25A and 25B are illustrations for explaining operation of the first shutter plate 57a, and FIGS. 26A and 26B are illustrations for explaining operation of the second shutter plate 57b.

The crank mechanism 50 is constructed outside of the housing 2 with a rotating arm 51 provided on the shutter-driving rotary shaft 11, and two stroke rods 52 and 53 having different lengths and provided pivotally on the rotating arm 51. Among these stroke rods 52 and 53, the shorter stroke rod 52 is provided on the tip end side of the rotating arm 51, and the longer stroke rod 53 is provided at substantially the center of the rotating arm 51. The shorter stroke rod 52 is pivotally coupled with the first shutter plate 57a located proximal to the housing 2 when the shutter 57 is in the closed condition. The longer stroke rod 53 is pivotally coupled with the second shutter plate 57b located distal to the housing 2 when the shutter 57 is in the closed condition.

Figures 23A, 23B:
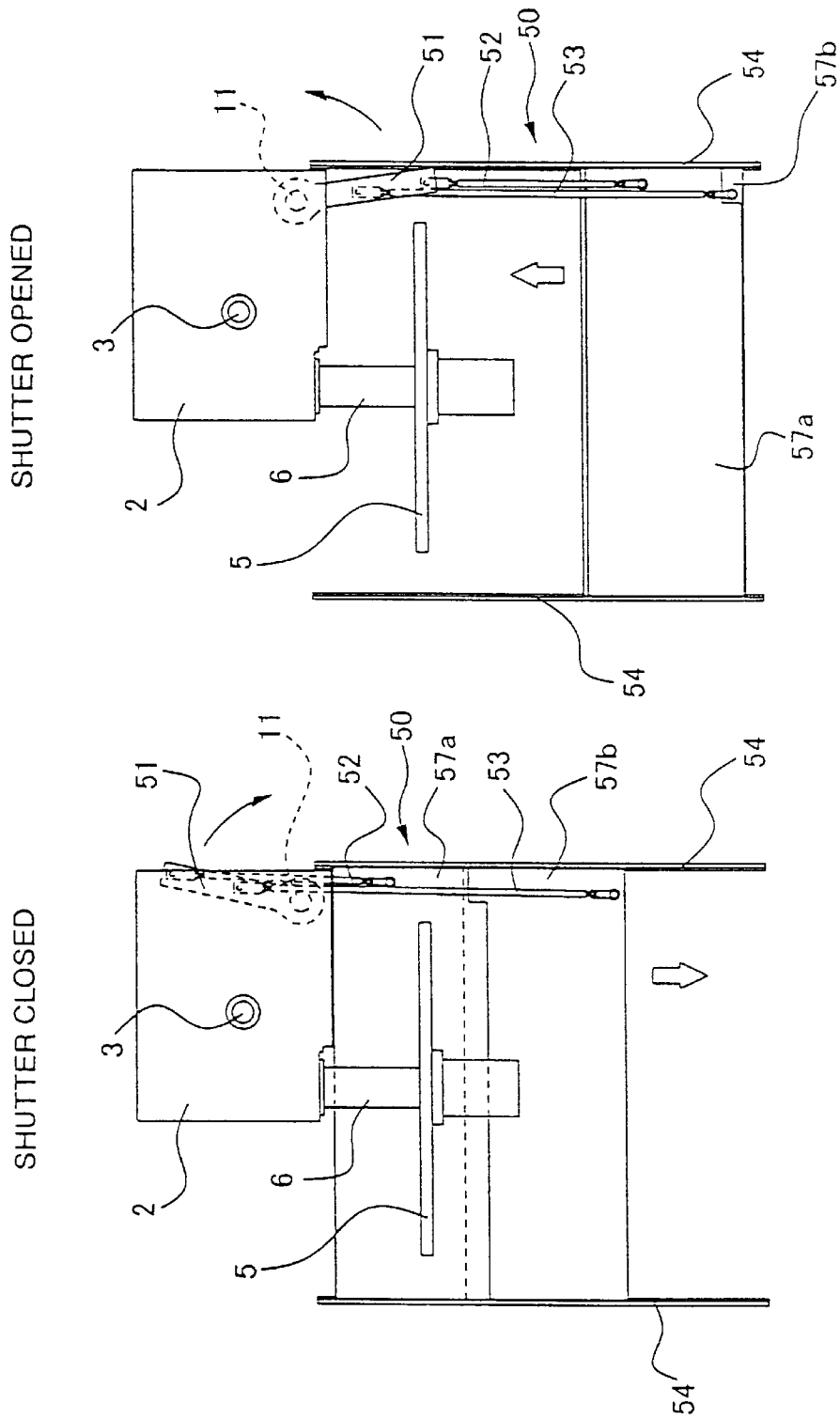
FIGS. 23A and 23B are front elevations showing the opened state and the closed state of the shutter of the cam-type automatic tool-exchanging apparatus shown in FIG. 21.

Then, the roller gear cam 13 is driven to rotate by rotation of the input rotary shaft 3. The tip end of the rotating arm 51 pivoted by rotation of the roller gear cam 13 reaches the highest position in its pivoting range when in the position close to the minimum radius portion of the opening/closing grooved cam 26 shown in FIG. 7. Then, the first shutter plate 57a is pulled to the uppermost position to be placed at the closest position on the side of the housing 2 (FIG. 25A), whereas the second shutter plate 57b is located between the first shutter plate 57a and the retracted region (FIG. 26A). On the other hand, the tip end of the rotating arm 51 reaches the lowermost position within its pivoting range when in the vicinity of the maximum radius portion of the opening/closing grooved cam 26 shown in FIG. 6, thereby placing the two shutter plates 57a and 57b in overlapping manner in the retracting region (FIG. 23B). Accordingly, the distance in which the second shutter plate 57a is moved by the crank mechanism 50 is set to be substantially half the moving distance of the first shutter plate 57a. Also, the speed in which the second shutter plate 57b moves is set to be substantially half the moving speed of the first shutter plate 57a.

Operation of the shown embodiment of the cam-type automatic tool-exchanging apparatus 1 is as discussed in connection with the first embodiment with reference to the timing chart example of the shutter opening/closing motion shown in FIG. 20.

This tool-exchanging operation is achieved by one turn of the input rotary shaft 3 over 360°. Then, in the present embodiment, in conjunction with this 360°-turn of the input rotary shaft 3, the shutter 57 is opened and closed once.

When the tool-exchanging arm 5 is in its initial condition, the shutter 57 starts to move in advance of the tool-exchanging operation (timing (a) on in FIG. 20). The shutter 57 is fully opened right before the tool-exchanging arm 5, which has started the 180° pivoting to transfer the tools Ta and Tb, passes across the position of the shutter 57 for the first time (the timing (g) in FIG. 20). The fully-opened condition of the shutter 57 is maintained until the tool-exchanging arm 5 being pivoted over 180° passes across the position of the shutter 57 for the second time (the timing (g) to (h) of FIG. 20). Immediately after the tool-exchanging arm 5 passes across the position of the shutter 57, the shutter 57 starts to close (from the timing (h) on in FIG. 20). After the tool-exchanging arm 5 returns to its initial position, the shutter 57 is fully closed (the timing (l) to 360° in FIG. 20).

The correlation of the tool-exchanging operation of the tool-exchanging arm 5 and the opening/closing operation of the shutter 57, according to the timing chart shown in FIG. 20, will be discussed hereinafter with reference to FIGS. 27A to 38B.

Figure 27A:
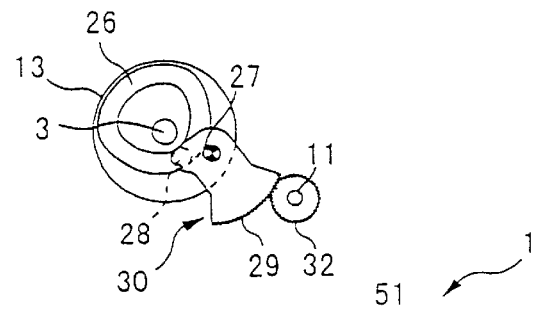
FIGS. 27A to 27C are explanatory illustrations for explaining a first stage of operation of the cam-type automatic tool-exchanging apparatus shown in FIG. 21.
Figure 27B:
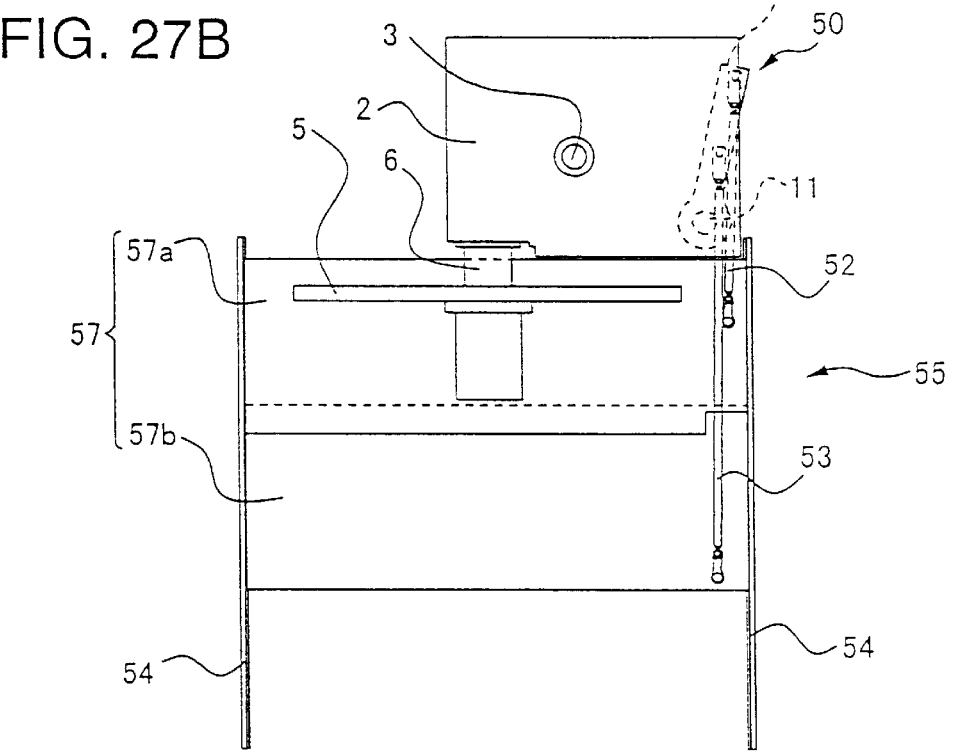
Figure 27C:
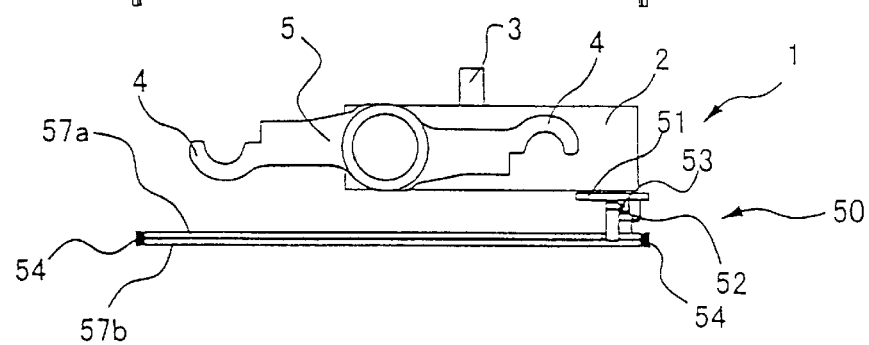

In the first stage (a)' as shown in FIGS. 27A to 27C, one end of the sector gear 29 is meshed with the driven gear 32. The crank mechanism 50 is placed in bent condition and in the vicinity of bottom dead center. By this, the shutter 57 is held closed, and the tool-exchanging arm 5 is placed in initial condition in parallel to the shutter 57.

In the second stage (b) shown in FIGS. 28A and 28B, the shutter-driving rotary shaft 11 starts to rotate, and the crank mechanism 50 starts to expand. Accordingly, both of the shutter plates 57a and 57b of the shutter 57 start to move, and the shutter 57 starts to open.

In the third stage (c) as shown in FIGS. 29A and 29B, the shutter 57 continues movement in the opening direction to be lowered below the height of the tool-exchanging arm 5, and in conjunction there with, the tool-exchanging arm 5 that has started its 90°-pivotal motion obliquely moves across the shutter position toward the main shaft of the machine tool, on which the used tool is installed.

Figure 30A:
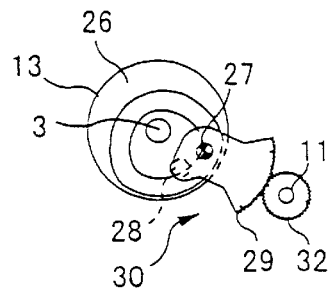
FIGS. 30A to 30C are explanatory illustrations for explaining a fourth stage of operation of the cam-type automatic tool-exchanging apparatus shown in FIG. 21.
Figure 30B:
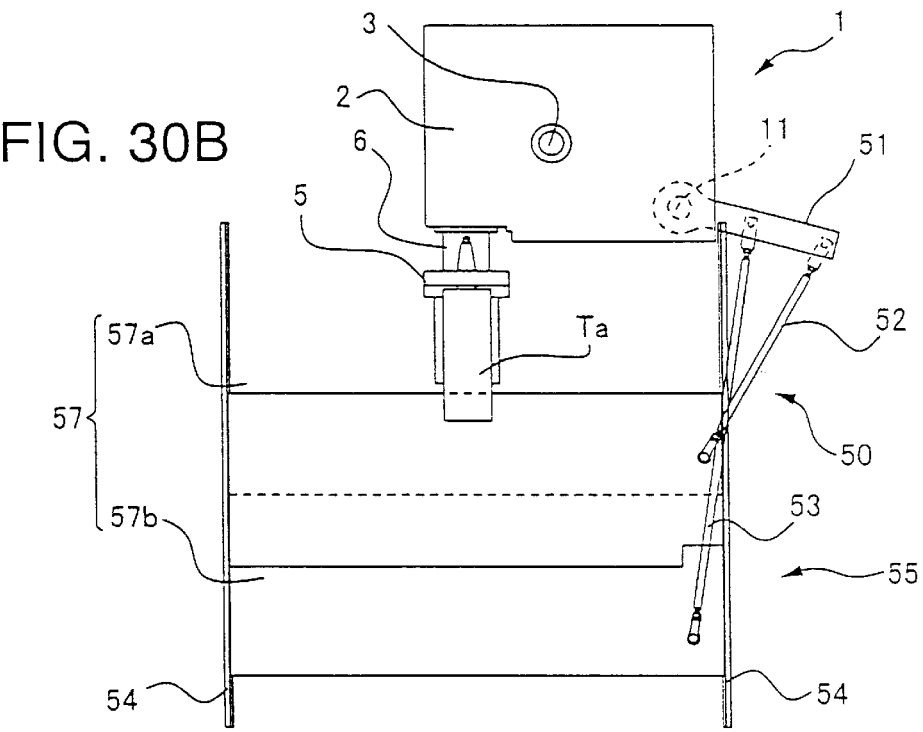
Figure 30C:
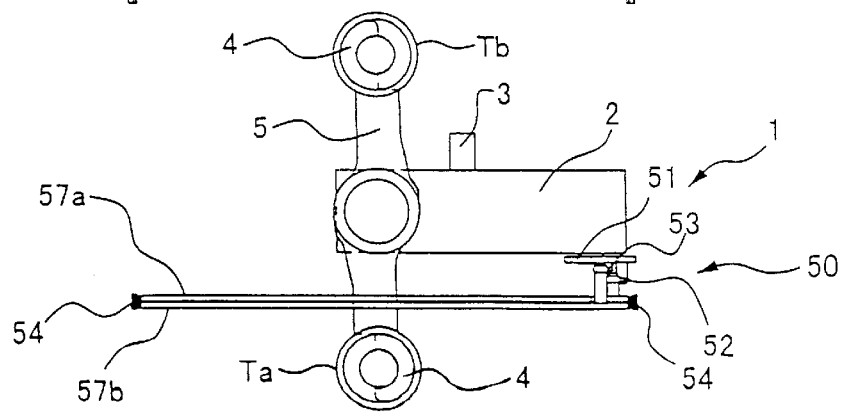

In the fourth stage (d) shown in FIGS. 30A to 30C, the substantially center portion of the sector gear 29 is meshing with the driven gear 32. The crank mechanism 50 continues expanding so that the shutter 57 continues to open. In conjunction therewith, the tool-exchanging arm 5 completes the 90°-pivotal motion and thus perpendicularly extends across the shutter position. Here, the tool-exchanging arm 5 grips the used tool Ta and the replacement tool Tb.

Figure 31A:
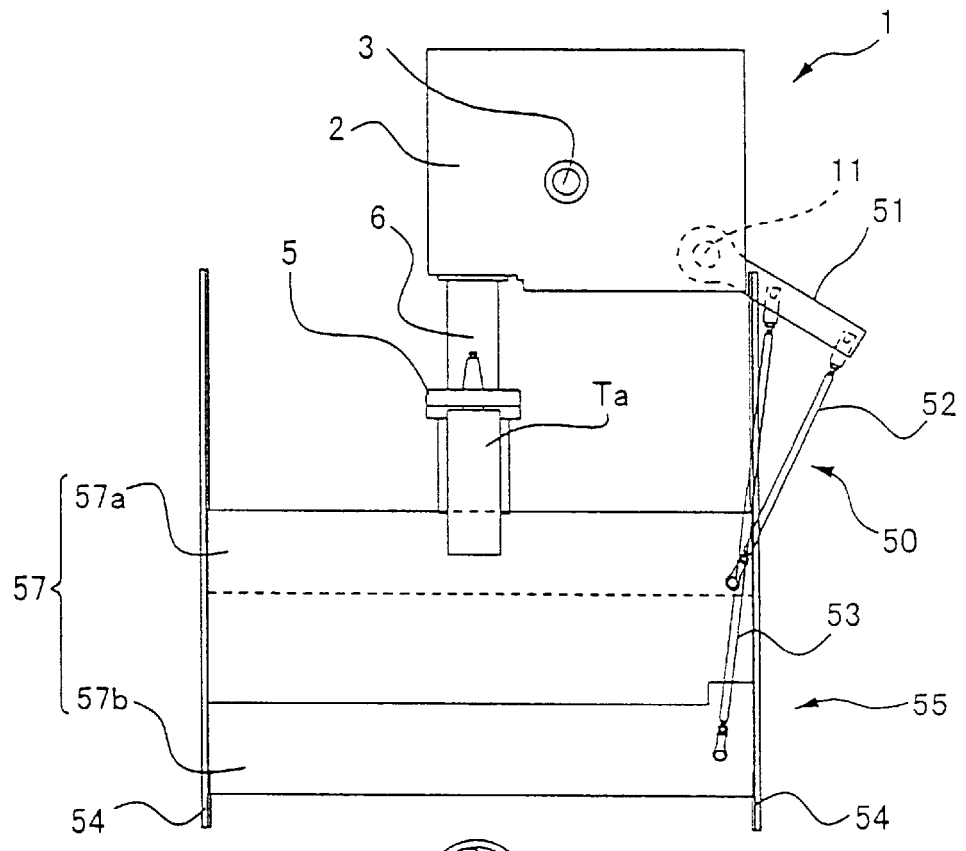
FIGS. 31A and 31B are explanatory illustrations for explaining a fifth stage of operation of the cam-type automatic tool-exchanging apparatus shown in FIG. 21.
Figure 31B:
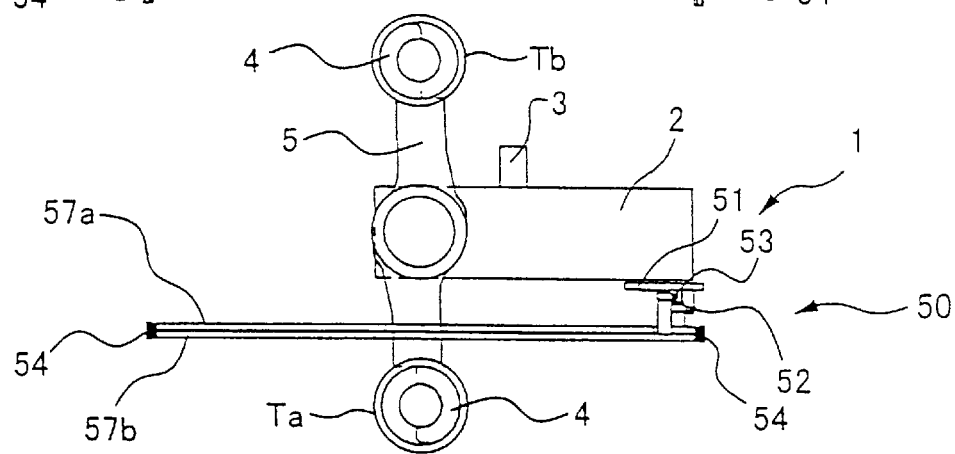

In the fifth stage (e) shown in FIGS. 31A and 31B, the shutter 57 continues opening. On the other hand, the tool-exchanging arm 5 that has started lifting-down (lowering) operation continues to move downward to withdraw the used tool Ta and the replacement tool Tb.

Figures 32A, 32B:
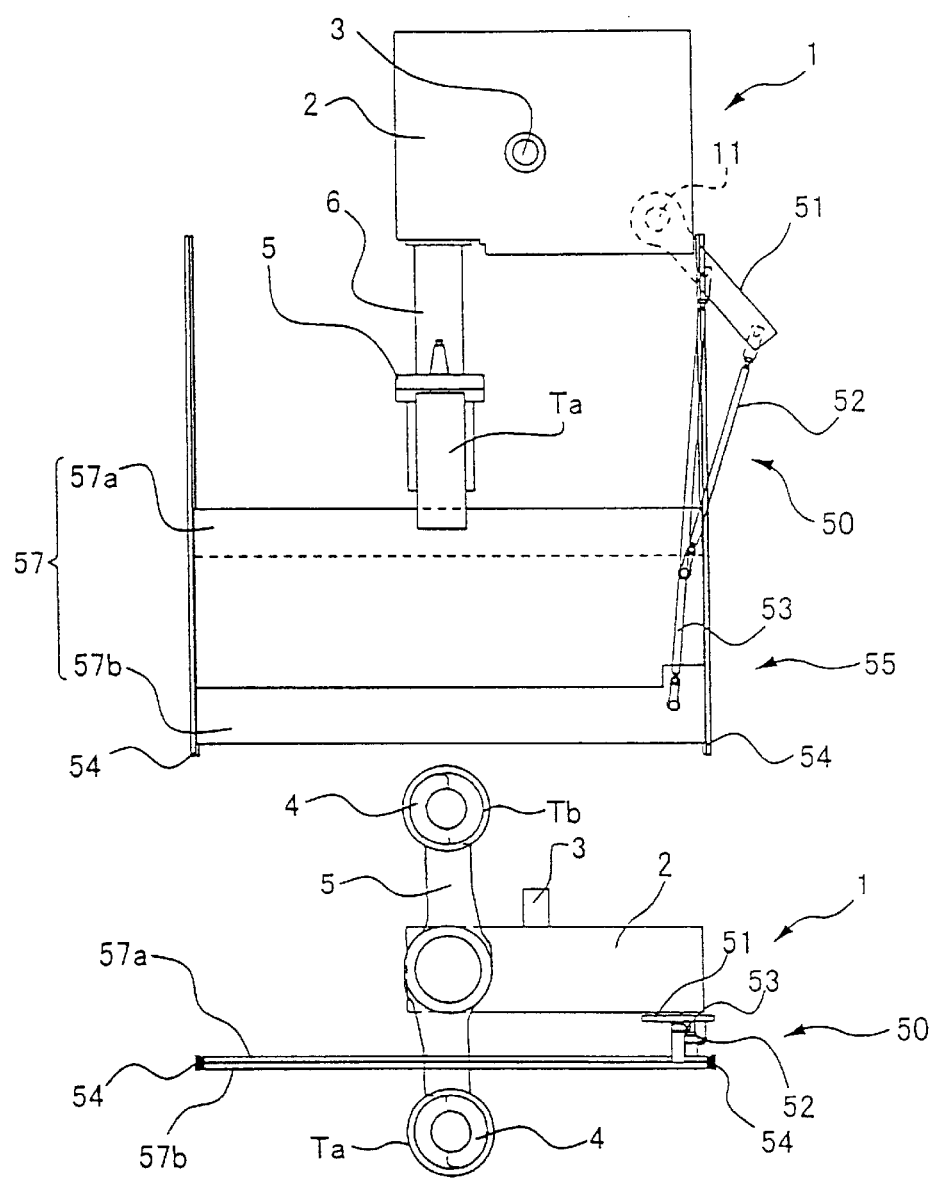
FIGS. 32A and 32B are explanatory illustrations for explaining a sixth stage of operation of the cam-type automatic tool-exchanging apparatus shown in FIG. 21.

In the sixth stage (f) shown in FIGS. 32A and 32B, the crank mechanism 50 continues its expanding motion to make the shutter 57 keep opening. On the other hand, the tool-exchanging arm 5 completes its lifting-down (lowering) motion to completely withdraw the tools Ta and Tb respectively from the main shaft and the tool magazine.

In the seventh stage (g) shown in FIGS. 33A to 33C, the other end of the sector gear 29 meshes with the driven gear 32, and the crank mechanism 50 is in its fully-expanded condition to reach the top dead center. The two shutter plates 57a and 57b overlap each other and stop in the retracting region. By this, the shutter 57 is placed in fully-opened condition to permit the tools Ta and Tb to pass across the shutter 57. Here, the tool-exchanging arm 5 that has initiated its 180°-pivotal motion approaches the shutter position for the first time, and the used tool Ta is moved to the tool magazine side.

Figures 34A, 34B:
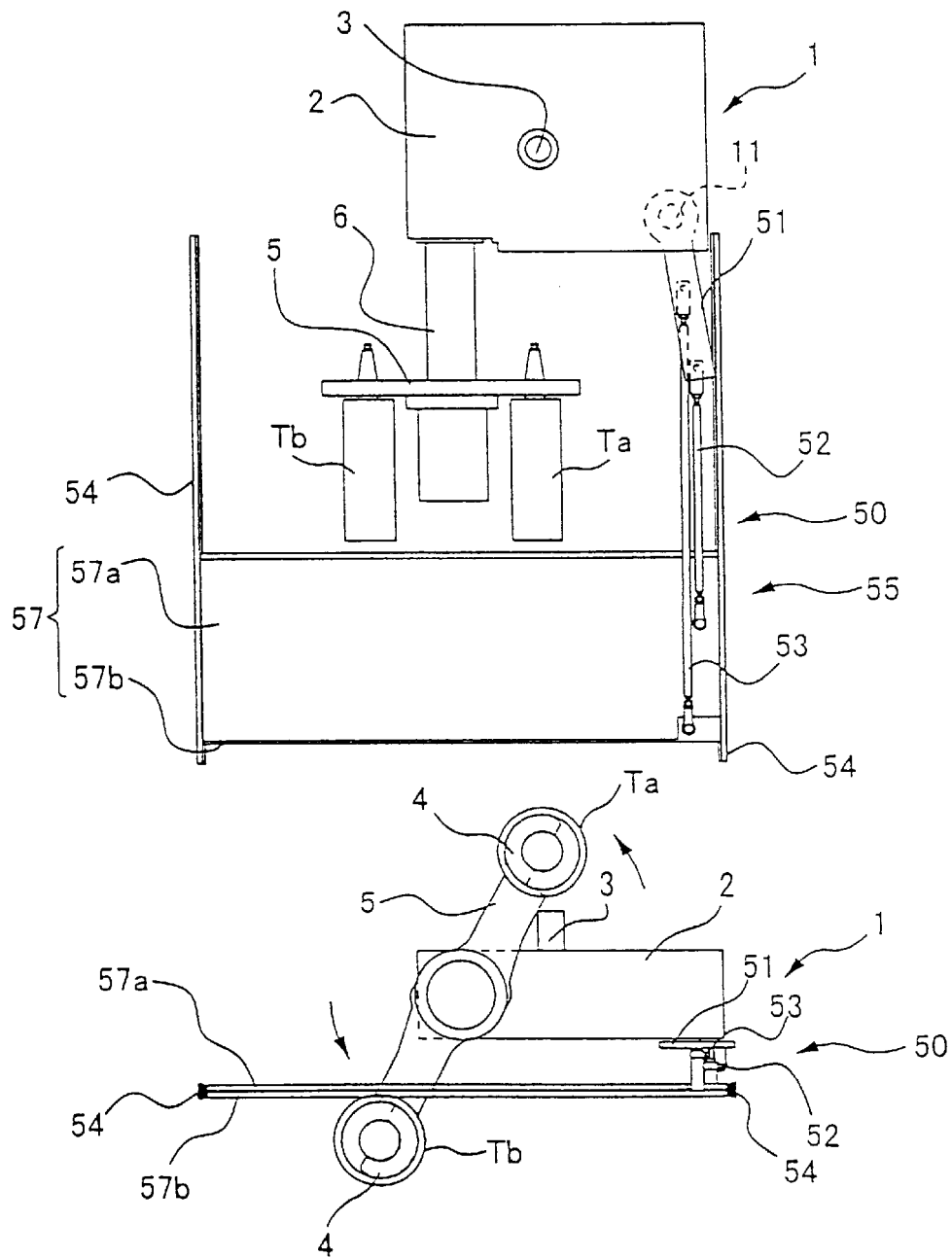
FIGS. 34A and 34B are explanatory illustrations for explaining an eighth stage of operation of the cam-type automatic tool-exchanging apparatus shown in FIG. 21.

In the eighth stage (h) shown in FIGS. 34A and 34B, the shutter 57 is held in its fully-open condition. On the other hand, the tool-exchanging arm 5 pivoting over 180° moves across the shutter position for the second time so as to insert the replacement tool Tb into the main shaft of the machine tool.

Figures 35A, 35B:
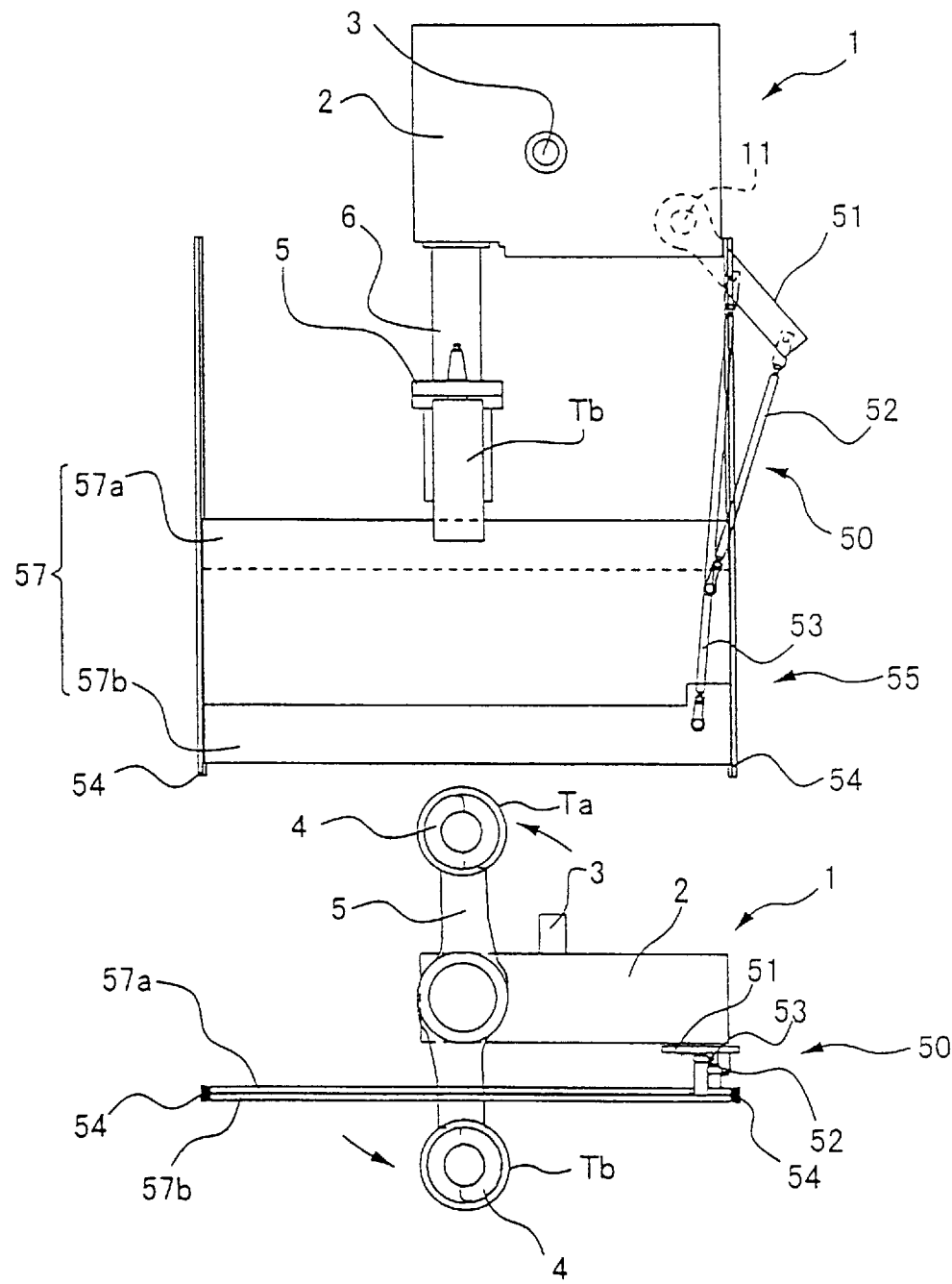
FIGS. 35A and 35B are explanatory illustrations for explaining a ninth stage of operation of the cam-type automatic tool-exchanging apparatus shown in FIG. 21.

In the ninth stage (i) shown in FIGS. 35A and 35B, the crank mechanism 50 has initiated its folding operation caused by the shutter-driving rotary shaft 11 initiating rotation in the reverse direction. Thus, the shutter plates 57a and 57b both start to move upwards, and thus, the shutter 57 starts to close. The tool-exchanging arm 5 completes its pivotal motion over 180° to extend perpendicularly across the shutter position.

Figure 36A:
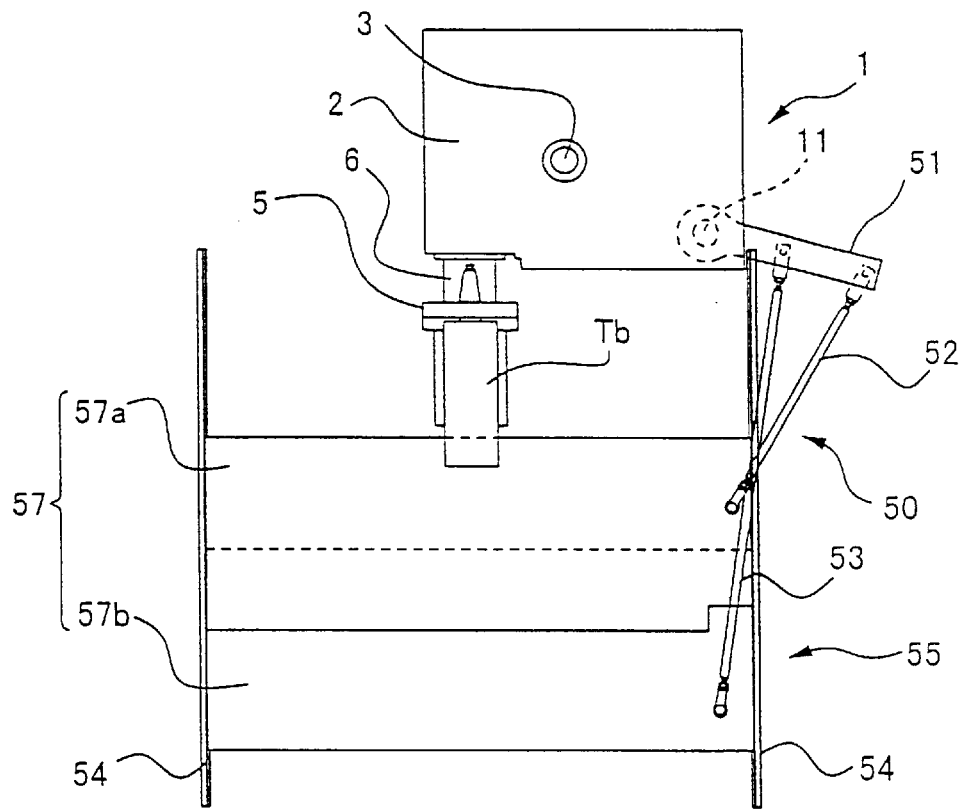
FIGS. 36A and 36B are explanatory illustrations for explaining a tenth stage of operation of the cam-type automatic tool-exchanging apparatus shown in FIG. 21.
Figure 36B:
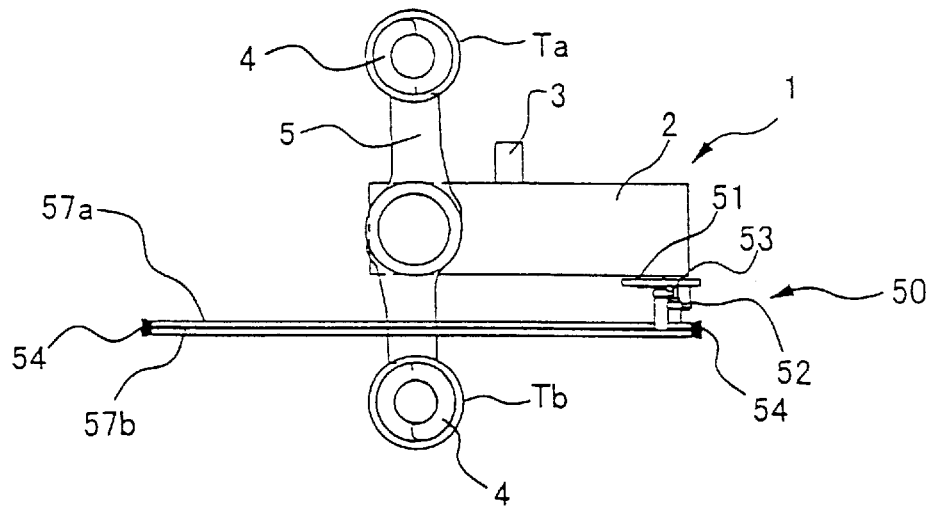

In the tenth stage (j) shown in FIGS. 36A and 36B, the shutter 57 continues to close. At the same time, the tool-exchanging arm 5, which is passing across the shutter position, is completely lifted up to set respective tools Ta and Tb to the tool magazine and the main shaft of the machine tool.

In the eleventh stage (k) shown in FIGS. 37A and 37B, the crank mechanism 50 continues its folding operation to drive the shutter 57 in the closing direction. The tool-exchanging arm 5 that has started pivotal motion over 90° to move away from the tools Ta and Tb moves obliquely across the shutter position that is in a closed condition still allowing this pivotal motion, to return to its initial position.

In the twelfth stage (l) shown in FIGS. 38A and 38B, the tool-exchanging arm 5 is completely returned to the initial position. In conjunction therewith, the shutter plates 57a and 57b both move in the direction to cover the closing region, and the shutter 57 is continuously driven toward the fully-closed condition. Finally, the tool-exchanging arm 5 and the shutter 57 are returned to the positions of the first stage (a) of FIGS. 27A to 27C.

As set forth above, the shown embodiment of the roller gear cam 13, the lifting/lowering grooved cam 19, and the opening/closing grooved cam 26 are formed with cam profiles for overlapping the tool-exchanging operation of the tool-exchanging arm 5 and the opening/closing operation of the shutter 57. Therefore, the tool-exchanging operation of the tool-exchanging arm 5 can be performed during the shutter opening/closing period in parallel. By this, it becomes possible to achieve speeding up of operation of the automatic tool-exchanging apparatus.

In the shown embodiment of the cam-type automatic tool-exchanging apparatus 1 provided with the shutter-driving mechanism having the structure as set forth above, the three cams 13, 19 and 26 can be driven by the single input rotary shaft 3. Namely, the shutter 57 can be driven by the input rotary shaft 3 that, on the other hand, drives the cams 13 and 19 of the automatic tool-exchanging apparatus. Thus, it becomes easy to synchronize the opening/closing operation of the shutter 57 to the tool-exchanging operation. At this time, within the housing 2, rotating operation or pivoting operation is mainly caused, and, pivotal motion for opening/closing the shutter 57 is outputted from the inside of the housing 2 to the outside thereof via the shutter-driving rotary shaft 11. Therefore, it becomes unnecessary to provide the opening/closing stroke of the shutter 57 within the housing 2, which thus prevents the apparatus 1 from becoming complicate in structure. Thus, it is possible to certainly synchronize the tool-exchanging operation and the shutter opening/closing operation in a short cycle period despite of the simple construction. Therefore, high-speed operation of the entire tool-exchanging operation including opening/closing operation of the shutter 57 can be certainly achieved.

Furthermore, the shutter 57 is constructed with two shutter plates 57a and 57b respectively formed to have substantially half the size of the closing region. Upon opening of the shutter 57, the two shutter plates 57a and 57b are retracted in overlapping manner. As shown in FIG. 39A and 39B, in comparison with the case where the shutter 77 is formed by one plate member, the apparatus can be formed compact to achieve space saving.

On the other hand, the weight M of the two shutter plates 57a and 57b forming the shutter 57 is substantially half of the weight of the shutter 77 formed by one plate member. Furthermore, the amount of movement X of the shutter plate 57b becomes substantially half of the movement amount of the shutter 77 in one piece construction. When calculating the respective amount of work when using the shutter 57 of the present embodiment and when using the one-piece shutter 77, the amount of work J1 of the case when employing the one-piece shutter 77 is expressed by:

$$J1=4MX,$$

whereas the amount of work J2 of the case when employing the shutter 57 of two piece construction of the present embodiment is expressed by:

$$J2=2MX+MX=3MX$$

Accordingly, the amount of work when using the shutter 57 of two-piece construction becomes smaller. Thus, further speeding up of the shutter operation becomes possible, and the shutter can obtain high braking performance. Therefore, further higher performance of the cam-type automatic tool-exchanging apparatus having the shutter-driving mechanism can be achieved.

As set forth above, since the tool-exchanging operation and the opening/closing operation of the shutter 57 can be certainly synchronized, it is possible to resolve the conventional problem in that, for example, the tool-exchanging operation by the tool-exchanging arm cannot be initiated until the opening/closing stroke of the shutter is confirmed, and particularly, until the "opening" of the shutter is confirmed.

On the other hand, operation of the entire apparatus 1 can be unitarily performed by a mechanical power-transmission mechanism comprising, for example, the cams 13, 19 and 26, the gears 29 and 32, and the slider crank mechanism 35. Therefore, no uncertain action will be caused, and it is possible to ensure high reliability of the apparatus 1.

Particularly, by employing the cam mechanism and crank mechanism suitable for high-speed operation, timings of the tool-exchanging operation and the shutter opening/closing operation in a short cycle period can be accurately synchronized.

Furthermore, with the simple mechanisms such as the opening/closing grooved cam 26, the opening/closing pivotal arm 30, the sector gear 29, the driven gear 32, and the crank mechanism 50 including the rotating arm 51, it is possible to obtain the large, reversible pivotal motion from unidirectional rotating motion of the input rotary shaft 3 to efficiently produce reciprocating strokes necessary for the opening/closing action of the shutter 57.

Figure 40A:
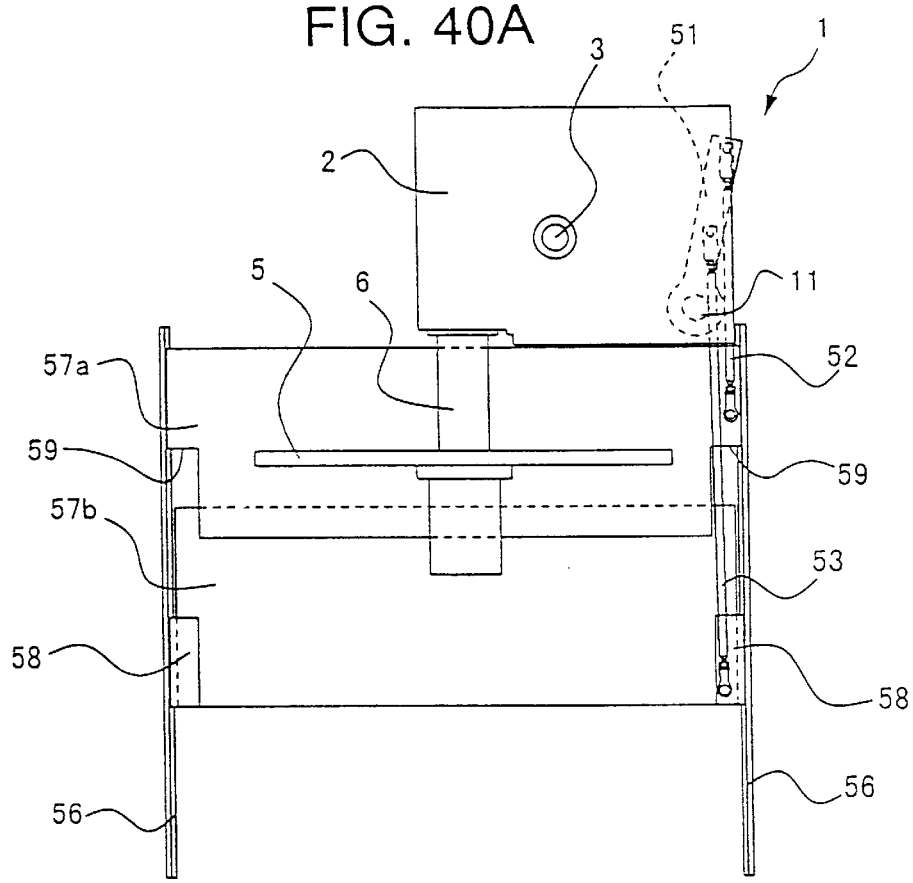
FIGS. 40A and 40B are explanatory illustrations for explaining a modification of the shown embodiment.
Figure 40B:
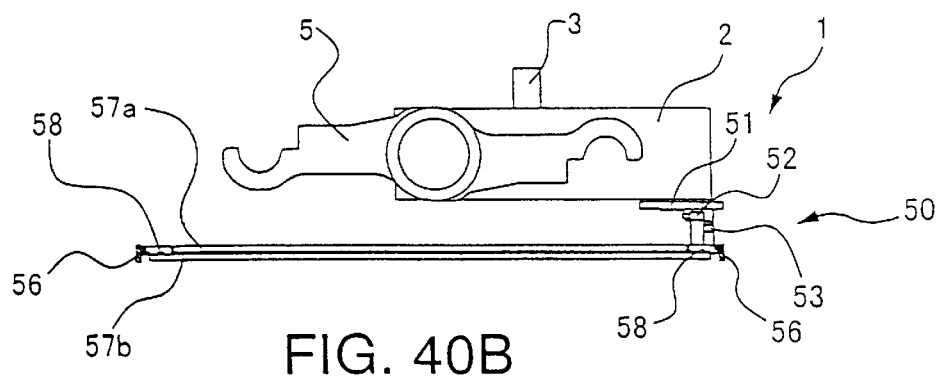
Figure 41:
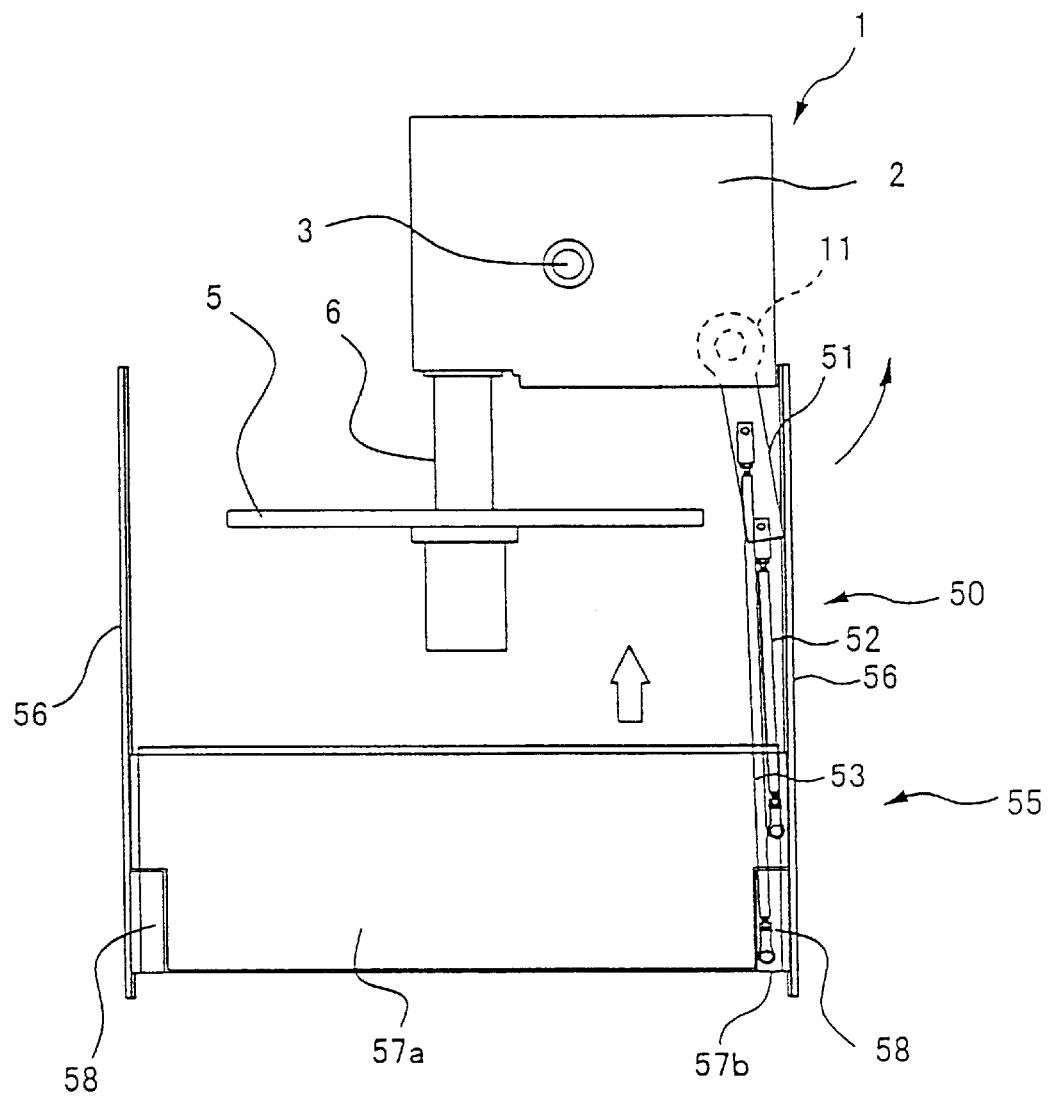
FIG. 41 is an explanatory illustration showing an opened state of the shutter in the cam-type automatic tool-exchanging apparatus shown in FIGS. 40A and 40B.

In the shown embodiment, the foregoing disclosure has been given for a construction employing the slide guides 54 having a plurality of rail portions 54a respectively for slidingly supporting the first shutter plate 57a and the second shutter plate 57b. However, as shown in FIGS. 40A, 40B and 41, it is also possible to provide support portions 58 on the second shutter plate 57b in the vicinity of the slide guides 56 and on the side of the retracting region. These support portions 58 are in phase with the first shutter plate 57a. With these support portions 58, the second shutter plate 57b may be supported and slid on the same rail portion 54a as the first shutter plate 57a. In this case, cut-outs 59 may be provided so that the support portions 38 do not interfere with the first shutter plate 57a when the two shutter plates 57a and 57b overlap in the retracting region. By supporting the two-piece shutter on a single rail portion 54a, further downsizing of the apparatus can be achieved.

Also, while the shutter is constructed with two piece of plate members in the shown embodiment, the shutter may be formed with a greater number of plate members. In such case, the number of stroke rods, length and so forth may be arbitrarily set depending upon the number of shutter plates, size, arrangement and so forth.

On the other hand, in the shown embodiment, the shorter stroke rod is provided on the tip end side of the rotating arm and the longer stroke rod is provided at substantially the center portion of the rotating arm. However, the arrangement of the stroke rods is not limited to the specific arrangement discussed in the shown embodiment. For example, it is possible to arrange a plurality of stroke rods in sequential order in such a manner that the shortest stroke rod may be arranged on the rotating center of the rotating arm and the longest stroke rod may be arranged on the tip end side of the rotating arm. In the alternative, it is possible to arbitrarily modify the arrangement of the stroke rods by, for example, appropriately differentiating the lengths of the stroke rods according to the structure of the shutter plates.

In short, according to an embodiment of the present invention of the cam-type automatic tool-exchanging apparatus with the shutter-driving mechanism, it is possible to certainly synchronize the tool-exchanging operation and the shutter opening/closing operation in a short cycle period despite of the simple construction. Therefore, high-speed operation of the entire tool-exchanging operation including opening/closing operation of the shutter can be certainly achieved.

Particularly, by structuring the shutter with a plurality of plate members, the plate members will overlap each other upon opening of the shutter. In such case, the shutter with the multiple piece construction can permit further downsizing for achieving a space-saving, compact apparatus in comparison with the case where a one-piece plate member is employed.

On the other hand, each of the plate members of the shutter in a multiple piece construction will have a smaller weight than that of the plate member of a one-piece shutter. Also, the amount of movement of some of the plate members in opening/closing of the shutter will be shorter. Thus, the amount of work for opening/closing the shutter of the multiple-plate-member construction becomes smaller than that for the shutter of the one-piece construction. Therefore, further speeding up of the shutter operation becomes possible, and high braking performance may be obtained.

Further, within the housing, rotating operation or pivoting operation is mainly caused, and, pivotal motion for opening/closing the shutter is outputted from the inside of the housing to the outside thereof via the shutter-driving rotary shaft. Therefore, it becomes unnecessary to provide the opening/closing stroke of the shutter within the housing, which thus prevents the apparatus from becoming complicate in structure.

On the other hand, operation of the entire apparatus can be unitarily performed by a mechanical power-transmission mechanism comprising, for example, cams, gears, and crank mechanisms. Therefore, no uncertain action will be caused, and it is possible to ensure high reliability of the apparatus.

Particularly, the crank mechanism realizes the opening/closing operation of the shutter in a simple way of differentiating the lengths of a plurality of stroke rods respectively connecting the rotating arm and a plurality of plate members, and arranging the stroke rods in sequence from the tip end of the rotating arm to the shutter-driving rotary shaft in order of increasing length, that is, the shortest one to the longest one. Accordingly, it becomes possible to realize certain operation without requiring any complicating control, even for a structure in which plurality of plate members are used.

Furthermore, with the simple mechanisms such as an opening/closing-motion producing cam, a pivotal arm, a sector gear, a driven gear, and a crank mechanism, it is possible to obtain the large, reversible pivotal motion from unidirectional rotating motion of an input rotary shaft to efficiently produce reciprocating strokes necessary for the opening/closing action of the shutter.

On the other hand, the turning radius of the sector gear is greater than the turning radius of the driven gear. By this, the driven gear can be rotated over a greater range in angle with the pivoting motion of the sector gear having a smaller range in angle, and the range of rotation angle of the shutter-driving rotary shaft can be made greater than the range of pivoting angle of the pivotal arm. Accordingly, it is possible to output a rotation having a large range of rotation angle to the shutter-driving rotary shaft while making the housing that receives the pivoting pivotal arm compact.

The shutter is formed by the slider crank mechanism together with the crank mechanism. With the slider crank mechanism which has a simple construction but is proven to be suitable for high-speed operation, it will be possible to obtain a shutter-opening/closing mechanism that can sufficiently comply with the high-speed tool-exchanging operation in the cam-type automatic tool-exchanging apparatus with the shutter-driving mechanism. On the other hand, by forming the crank mechanism large, downsizing of the housing can be assured while providing sufficiently large opening/closing strokes of the shutter.

The rotational-motion converting cam, the lifting/lowering-motion producing cam, and the opening/closing-motion producing cam are formed with cam profiles for overlapping the tool-exchanging operation timing of the tool-exchanging arm and the opening/closing operation timing of the shutter. Therefore, the tool-exchanging operation of the tool-exchanging arm can be performed during the shutter opening/closing period in parallel. By this, it becomes possible to achieve speeding up of operation of the automatic tool-exchanging apparatus.

Furthermore, since the rotational-motion converting cam, the lifting/lowering-motion producing cam, and the opening/closing-motion producing cam are provided in a single cam body provided on a single input rotary shaft, the housing can be made compact to contribute to downsizing of the entire apparatus, and also, it is possible to ensure high motion accuracy and high operational stability.

Although the preferred embodiment of the present invention has been described in detail, it should be understood that various changes, substitutions and alterations can be made therein without departing from spirit and scope of the inventions as defined by the appended claims.

What is claimed is:

1. A cam-type automatic tool-exchanging apparatus comprising:
    a housing;
    an input rotary shaft provided within said housing;
    a rotational-motion converting cam provided within said housing, said rotational-motion converting cam being rotationally driven by said input rotary shaft and outputting a rotational motion;
    a lifting/lowering-motion producing cam provided within said housing, said lifting/lowering-motion producing cam being rotationally driven by said input rotary shaft and outputting a lifting/lowering motion;
    a tool-exchanging arm provided outside of said housing and driven by said rotational motion and said lifting/lowering motion outputted from said cams for performing a tool-exchanging operation;
    a shutter provided outside of said housing, said shutter to be opened/closed in accordance with said tool-exchanging operation of said tool-exchanging arm;
    an opening/closing-motion producing cam provided within said housing, said opening/closing-motion producing cam being rotationally driven by said input rotary shaft and outputting a shutter-opening/closing pivotal motion for opening/closing said shutter;
    a shutter-driving rotary shaft provided within said housing, said shutter-driving rotary shaft outputting said shutter-opening/closing pivotal motion of said opening/closing-motion producing cam from inside of said housing to the outside;

a pivotal arm, said pivotal arm
  being pivotally supported on said housing,
  having on one end a cam follower engaging with said opening/closing-motion producing cam, and
  having on the other end a sector gear; and
a driven gear provided on said shutter-driving rotary shaft and meshing with said sector gear,
  wherein said shutter-opening/closing pivotal motion of said opening/closing-motion producing cam is transmitted to said shutter-driving rotary shaft.

2. A cam-type automatic tool-exchanging apparatus according to claim 1, wherein,
  said shutter comprises a plurality of plate members; and
  said plurality of plate members are made to overlap each other and said shutter is made to open according to said rotational motion of said input rotary shaft.

3. A cam-type automatic tool-exchanging apparatus according to claim 2, wherein
  said shutter is provided slidably on at least one slide guide for guiding sliding of said shutter, and is connected to said shutter-driving rotary shaft via a crank mechanism.

4. A cam-type automatic tool-exchanging apparatus according to claim 3, wherein said crank mechanism comprises
  a rotating arm provided on said shutter-driving rotary shaft, and
  a plurality of stroke rods having different lengths and respectively connecting said rotating arm and said plurality of plate members,
  said respective stroke rods being sequentially arranged on said rotating arm in order of increasing length from a tip end side of said rotating arm toward said shutter-driving rotary shaft.

5. A cam-type automatic tool-exchanging apparatus according to claim 1, wherein a turning radius of said sector gear is greater than a turning radius of said driven gear so that a range of rotation angle of said shutter-driving rotary shaft is set to be greater than a range of pivoting angle of said pivotal arm.

6. A cam-type automatic tool-exchanging apparatus according to claim 1, wherein
  said shutter is provided slidably on at least one slide guide for guiding sliding of said shutter, and is connected to said shutter-driving rotary shaft via a crank mechanism.

7. A cam-type automatic tool-exchanging apparatus according to claim 1, wherein said rotational-motion converting cam, said lifting/lowering-motion producing cam, and said opening/closing motion producing cam are formed to have cam profiles for overlapping a timing of said tool-exchanging operation and a timing of said opening/closing operation, so as to make said tool-exchanging operation of said tool-exchanging arm be performed during a period of said opening/closing operation of said shutter in parallel.

8. A cam-type automatic tool-exchanging apparatus according to claim 1, wherein said rotational-motion converting cam, said lifting/lowering-motion producing cam, and said opening/closing motion producing cam are provided on a single cam body, said cam body being provided on said input rotary shaft.

* * * * *